(12) United States Patent
Lockwood et al.

(10) Patent No.: US 8,190,289 B2
(45) Date of Patent: May 29, 2012

(54) DISPENSING AND DISPLAY SYSTEM

(75) Inventors: Thomas A. Lockwood, Clemmons, NC (US); Roger K. Miller, East Bend, NC (US); Scott H. Stapleford, Londonderry, NH (US); Gary N. Stapleford, Londonderry, NH (US)

(73) Assignee: Rock-Tenn Shared Services, LLC, Norcross, GA (US)

( * ) Notice: Subject to any disclaimer, the term of this patent is extended or adjusted under 35 U.S.C. 154(b) by 377 days.

(21) Appl. No.: 12/567,370

(22) Filed: Sep. 25, 2009

(65) Prior Publication Data

US 2010/0017025 A1    Jan. 21, 2010

Related U.S. Application Data

(63) Continuation-in-part of application No. 11/528,032, filed on Sep. 27, 2006, now Pat. No. 7,641,072, which is a continuation-in-part of application No. 11/409,885, filed on Apr. 24, 2006, now abandoned, and a continuation-in-part of application No. 10/967,811, filed on Oct. 18, 2004, now abandoned, application No. 12/567,370, which is a continuation-in-part of application No. 11/409,885, filed on Apr. 24, 2006, now abandoned.

(60) Provisional application No. 61/100,213, filed on Sep. 25, 2008, provisional application No. 61/183,321, filed on Jun. 2, 2009, provisional application No. 60/720,823, filed on Sep. 27, 2005, provisional application No. 60/674,880, filed on Apr. 25, 2005, provisional application No. 60/512,454, filed on Oct. 17, 2003.

(51) Int. Cl.
  *G06F 17/00* (2006.01)

(52) U.S. Cl. ................. 700/236; 221/3; 221/15
(58) Field of Classification Search ............... 221/151, 221/152, 125, 126, 3, 15, 270, 279; 312/35, 312/71; 700/236
  See application file for complete search history.

(56) References Cited

U.S. PATENT DOCUMENTS

| 691,990 A | 1/1902 | Warren |
| 1,034,318 A | 7/1912 | Sobretto et al. |

(Continued)

FOREIGN PATENT DOCUMENTS

DE    20 2005 010 088 U1    10/2005

(Continued)

OTHER PUBLICATIONS

Annex to Form PCT/ISA/206—Communication Relating to the Results of the Partial International Search dated Aug. 20, 2010 in related Application No. PCT/US2010/037026.

(Continued)

*Primary Examiner* — Timothy Waggoner
(74) *Attorney, Agent, or Firm* — Kilpatrick Townsend & Stockton LLP

(57) ABSTRACT

A system for controlling advancement of and access to product and for generating data associated with such advancement and access. Systems of this invention include a pusher system having a track, a pusher, and mechanisms for generating data relating to the movement of the pusher. Certain embodiments of the invention include a door assembly, which controls consumer access to product located behind the door assembly, a stop for limiting the forward progression of the pusher along the track, and mechanisms for generating data relating to when and/or for how long the door assembly is open.

33 Claims, 20 Drawing Sheets

U.S. PATENT DOCUMENTS

| | | |
|---|---|---|
| 1,123,071 A | 12/1914 | Bell |
| 1,319,084 A | 10/1919 | Hume |
| 1,533,147 A | 4/1925 | Svendsgaard |
| 1,592,720 A | 7/1926 | Butler |
| 1,614,363 A | 1/1927 | Hicks |
| 1,680,275 A | 8/1928 | Albaugh |
| 1,755,655 A | 4/1930 | Langenfeld |
| 1,813,935 A | 7/1931 | Knee |
| 1,841,926 A | 1/1932 | Wray |
| 1,913,843 A | 6/1933 | Marcuse |
| 2,142,053 A | 12/1938 | Hoban |
| 2,163,280 A | 6/1939 | Hibshman |
| 2,304,533 A | 12/1942 | Bright |
| 2,412,368 A | 2/1945 | Tascher |
| 2,824,666 A | 2/1958 | Hausladen |
| 2,977,023 A | 3/1961 | Meyer |
| 3,161,295 A | 12/1964 | Chesley |
| 3,199,724 A | 8/1965 | Domenico et al. |
| 3,313,448 A | 4/1967 | Howard et al. |
| 3,351,233 A | 11/1967 | Chanoch et al. |
| 3,452,899 A | 7/1969 | Libberton |
| 3,578,207 A | 5/1971 | Danow |
| 3,583,568 A | 6/1971 | Crossien |
| 3,591,048 A | 7/1971 | Myers |
| 3,749,279 A | 7/1973 | Ungerman |
| 3,752,357 A | 8/1973 | Harris |
| 3,776,418 A | 12/1973 | Bookout |
| 3,796,345 A | 3/1974 | Fessler |
| 3,805,962 A | 4/1974 | Bendiksen |
| 3,923,159 A | 12/1975 | Taylor et al. |
| 3,957,173 A | 5/1976 | Roudebush |
| 3,968,900 A | 7/1976 | Stambuk |
| 3,999,662 A | 12/1976 | Barnhardt |
| 4,007,853 A | 2/1977 | Bahneman |
| 4,010,869 A | 3/1977 | Adamo |
| 4,018,100 A | 4/1977 | Moe |
| 4,190,179 A | 2/1980 | Moss et al. |
| 4,228,903 A | 10/1980 | Eckert |
| 4,275,819 A | 6/1981 | Perez |
| 4,308,974 A | 1/1982 | Jones |
| 4,336,892 A | 6/1982 | Cox et al. |
| 4,369,887 A | 1/1983 | Emery |
| 4,371,093 A | 2/1983 | Berger |
| 4,412,607 A | 11/1983 | Collins et al. |
| 4,474,300 A | 10/1984 | Entis |
| 4,506,607 A | 3/1985 | Jacoby |
| 4,576,272 A | 3/1986 | Morgan et al. |
| 4,679,684 A | 7/1987 | Glaser |
| 4,682,826 A | 7/1987 | Mestdagh |
| 4,779,760 A | 10/1988 | Wittern et al. |
| 4,852,767 A | 8/1989 | Humphrey |
| 4,887,737 A | 12/1989 | Adenau |
| 4,954,760 A | 9/1990 | Futch et al. |
| 4,962,867 A | 10/1990 | Ficken et al. |
| 4,965,551 A | 10/1990 | Box |
| 5,012,936 A | 5/1991 | Crum |
| 5,046,641 A | 9/1991 | Gray |
| 5,067,634 A | 11/1991 | Vidondo |
| 5,096,367 A | 3/1992 | Winski |
| 5,097,611 A | 3/1992 | Smollar et al. |
| 5,111,942 A | 5/1992 | Bernardin |
| 5,121,854 A | 6/1992 | Trouteaud et al. |
| 5,150,101 A | 9/1992 | Goris et al. |
| 5,169,027 A | 12/1992 | Falk et al. |
| 5,199,598 A | 4/1993 | Sampson |
| 5,229,749 A | 7/1993 | Yenglin |
| 5,232,102 A | 8/1993 | Ozawa |
| 5,240,126 A | 8/1993 | Foster et al. |
| 5,248,060 A | 9/1993 | Friedman et al. |
| 5,249,705 A | 10/1993 | Gates |
| 5,252,948 A | 10/1993 | Goris et al. |
| 5,263,596 A | 11/1993 | Williams |
| 5,269,597 A | 12/1993 | Yenglin et al. |
| 5,285,926 A | 2/1994 | Falk et al. |
| 5,335,816 A | 8/1994 | Kaufman et al. |
| 5,335,818 A | 8/1994 | Maldanis |
| 5,360,134 A | 11/1994 | Falk |
| 5,375,735 A | 12/1994 | Huvey et al. |
| 5,375,737 A | 12/1994 | Ficken |
| 5,385,266 A | 1/1995 | Pate |
| 5,397,025 A | 3/1995 | Lee |
| 5,400,919 A | 3/1995 | Gomm et al. |
| 5,439,136 A | 8/1995 | Chatani et al. |
| 5,450,969 A | 9/1995 | Johnson et al. |
| 5,460,294 A * | 10/1995 | Williams ........................ 221/2 |
| 5,462,198 A | 10/1995 | Schwimmer |
| 5,542,552 A | 8/1996 | Yablans et al. |
| 5,632,408 A | 5/1997 | Mitchell |
| 5,665,304 A | 9/1997 | Heinen et al. |
| 5,709,315 A | 1/1998 | Kahler et al. |
| 5,790,409 A | 8/1998 | Fedor et al. |
| 5,813,568 A | 9/1998 | Lowing |
| 5,855,281 A | 1/1999 | Rabas |
| 5,909,932 A | 6/1999 | Shih |
| 5,960,984 A | 10/1999 | Weston |
| 5,960,988 A | 10/1999 | Freixas |
| 6,084,511 A | 7/2000 | Kil |
| 6,131,748 A | 10/2000 | Kawasaki et al. |
| 6,176,558 B1 | 1/2001 | Hlade et al. |
| 6,196,416 B1 | 3/2001 | Seagle |
| 6,199,720 B1 | 3/2001 | Rudick et al. |
| 6,206,237 B1 | 3/2001 | Dillon et al. |
| 6,230,932 B1 * | 5/2001 | Lowing et al. ................ 221/280 |
| 6,241,121 B1 * | 6/2001 | Yasaka ........................ 221/226 |
| 6,263,259 B1 | 7/2001 | Bartur |
| 6,301,501 B1 | 10/2001 | Cronin et al. |
| 6,318,591 B1 | 11/2001 | Martin |
| 6,325,242 B1 | 12/2001 | Izawa et al. |
| 6,454,107 B1 | 9/2002 | Belanger et al. |
| 6,464,089 B1 | 10/2002 | Rankin |
| 6,474,478 B1 | 11/2002 | Huehner et al. |
| 6,478,187 B2 | 11/2002 | Simson et al. |
| 6,520,604 B1 | 2/2003 | Yasaka et al. |
| 6,581,798 B2 | 6/2003 | Liff et al. |
| 6,601,416 B1 | 8/2003 | Sanders |
| 6,604,652 B1 | 8/2003 | Trautwein |
| 6,622,979 B2 | 9/2003 | Valiulis |
| 6,659,291 B2 | 12/2003 | Huchner et al. |
| 6,684,126 B2 * | 1/2004 | Omura et al. ................ 700/236 |
| 6,691,891 B2 | 2/2004 | Maldonado |
| 6,694,221 B2 * | 2/2004 | Chavez et al. ............... 700/236 |
| 6,735,473 B2 | 5/2004 | Kolder et al. |
| D491,403 S | 6/2004 | Gervasi |
| 6,758,370 B2 | 7/2004 | Cooke et al. |
| 6,776,304 B2 | 8/2004 | Liff et al. |
| 6,786,341 B2 | 9/2004 | Stinnett et al. |
| 6,814,254 B2 | 11/2004 | Liff et al. |
| 6,814,255 B2 | 11/2004 | Liff et al. |
| 6,857,539 B2 | 2/2005 | Parra |
| 6,892,898 B1 | 5/2005 | Boone et al. |
| 6,957,555 B1 | 10/2005 | Nagel et al. |
| 7,007,810 B2 | 3/2006 | Huehner et al. |
| 7,017,778 B2 | 3/2006 | Halbherr |
| 7,024,894 B2 | 4/2006 | Arto |
| 7,032,776 B2 | 4/2006 | Hieb |
| D521,363 S | 5/2006 | Copen et al. |
| 7,086,541 B2 | 8/2006 | Robertson |
| 7,128,221 B2 | 10/2006 | Metcalf |
| 7,128,239 B2 | 10/2006 | Skavnak |
| 7,149,600 B2 | 12/2006 | Rippolone |
| 7,151,982 B2 | 12/2006 | Liff et al. |
| 7,178,678 B2 | 2/2007 | Mansfield et al. |
| 7,197,902 B1 | 4/2007 | Barkdoll |
| 7,207,447 B2 | 4/2007 | Medcalf et al. |
| 7,213,722 B2 | 5/2007 | Nagelski et al. |
| 7,246,711 B1 | 7/2007 | Metcalf |
| 7,249,761 B2 | 7/2007 | Graef et al. |
| 7,264,138 B2 | 9/2007 | Collins et al. |
| 7,269,983 B1 | 9/2007 | Mchatet |
| 7,293,672 B2 | 11/2007 | Mori |
| 7,303,095 B2 | 12/2007 | Nagelski |
| 7,347,335 B2 | 3/2008 | Rankin, VI et al. |
| 7,348,884 B2 | 3/2008 | Higham |
| 7,458,473 B1 | 12/2008 | Mason |
| 7,469,791 B2 | 12/2008 | Phoy |
| 7,533,784 B2 | 5/2009 | Vlastakis |
| 7,564,351 B2 | 7/2009 | Nagelski et al. |

| | | |
|---|---|---|
| 7,641,072 B1 | 1/2010 | Vlastakis et al. |
| 7,675,421 B2 | 3/2010 | Higham |
| 7,768,399 B2 | 8/2010 | Hachmann et al. |
| 8,013,740 B2 | 9/2011 | Irmscher et al. |
| 2003/0029816 A1 | 2/2003 | Huchner et al. |
| 2003/0121929 A1 | 7/2003 | Liff et al. |
| 2003/0178435 A1 | 9/2003 | Yamaguchi |
| 2003/0189058 A1 | 10/2003 | Liff et al. |
| 2004/0026344 A1 | 2/2004 | Sedon et al. |
| 2004/0059464 A1 | 3/2004 | Veenstra et al. |
| 2004/0060944 A1 | 4/2004 | Gervasi |
| 2004/0084386 A1 | 5/2004 | Huchner et al. |
| 2004/0104239 A1 | 6/2004 | Black et al. |
| 2004/0149768 A1 | 8/2004 | Scoville et al. |
| 2004/0238557 A1 | 12/2004 | Chirnomas |
| 2005/0029205 A1 | 2/2005 | Mansfield et al. |
| 2005/0029283 A1 | 2/2005 | Pedigo |
| 2005/0065645 A1 | 3/2005 | Liff et al. |
| 2005/0189369 A1 | 9/2005 | Vlastakis |
| 2005/0189370 A1 | 9/2005 | Carter et al. |
| 2005/0199644 A1 | 9/2005 | Barili et al. |
| 2005/0205596 A1 | 9/2005 | Kelly |
| 2005/0252925 A1 | 11/2005 | Kelly |
| 2006/0138915 A1 | 6/2006 | Goldberg |
| 2006/0157431 A1 | 7/2006 | Nagelski et al. |
| 2006/0219730 A1 | 10/2006 | Handfield et al. |
| 2006/0237381 A1 | 10/2006 | Lockwood |
| 2006/0266762 A1 | 11/2006 | Andrews |
| 2007/0029340 A1 | 2/2007 | Nagelski et al. |
| 2007/0078561 A1 | 4/2007 | Sansone |
| 2007/0080175 A1 | 4/2007 | Peterson |
| 2007/0119796 A1 | 5/2007 | Barkdoll |
| 2007/0199863 A1 | 8/2007 | Knoettgen-Nap |
| 2007/0221679 A1 | 9/2007 | Chandler et al. |
| 2007/0251900 A1 | 11/2007 | Hardy |
| 2007/0273513 A1 | 11/2007 | White |
| 2007/0278164 A1 | 12/2007 | Lang et al. |
| 2007/0283615 A1 | 12/2007 | Vlastakis et al. |
| 2008/0092394 A1 | 4/2008 | Freitag et al. |
| 2008/0142538 A1 | 6/2008 | Miller |
| 2008/0246375 A1 | 10/2008 | Berg |
| 2008/0283477 A1 | 11/2008 | Wamsley et al. |
| 2009/0084745 A1 | 4/2009 | Goehring |
| 2009/0184069 A1 | 7/2009 | Hardy |
| 2009/0184129 A1 | 7/2009 | Vlastakis et al. |
| 2009/0184130 A1 | 7/2009 | Miller et al. |
| 2009/0242582 A1 | 10/2009 | Vlastakis et al. |
| 2009/0321373 A1 | 12/2009 | Hardy |
| 2010/0079240 A1 | 4/2010 | Higham |
| 2010/0147783 A1 | 6/2010 | Hardy |
| 2010/0188221 A1 | 7/2010 | Irmscher et al. |
| 2011/0017763 A1 | 1/2011 | Coielli et al. |
| 2011/0042331 A1 | 2/2011 | Johnson et al. |
| 2011/0042332 A1 | 2/2011 | Hardy |
| 2011/0094975 A1 | 4/2011 | Hardy |
| 2011/0210084 A1 | 9/2011 | Hardy |
| 2011/0220597 A1 | 9/2011 | Sherretts et al. |
| 2011/0240569 A1 | 10/2011 | Kahl et al. |
| 2011/0284488 A1 | 11/2011 | Hardy |
| 2011/0315706 A1 | 12/2011 | Lockwood |
| 2012/0000869 A1 | 1/2012 | Hardy |

FOREIGN PATENT DOCUMENTS

| | | |
|---|---|---|
| DE | 20 2005 019 621 U1 | 3/2006 |
| DE | 20 2007 011 927 U1 | 12/2007 |
| EP | 1 541 064 B1 | 6/2005 |
| EP | 1579789 | 9/2005 |
| JP | 01144185 | 6/1989 |
| JP | 02219194 | 8/1990 |
| JP | 09319937 | 12/1997 |
| JP | 2005049965 | 1/2005 |
| JP | 2006285930 | 10/2006 |
| WO | WO 8912873 | 12/1989 |
| WO | WO 2004/028311 | 4/2004 |
| WO | WO 2007/054042 | 5/2007 |
| WO | WO 2007/085211 | 8/2007 |
| WO | WO2010094778 | 8/2010 |
| WO | WO-2010141552 A2 | 12/2010 |

OTHER PUBLICATIONS

International Search Report and Written Opinion in International Application Serial No. PCT/US2010/037026 mailed Nov. 26, 2010.
International Preliminary Report on Patentability dated Dec. 15, 2011 in Application No. PCT/US2010/037026.

* cited by examiner

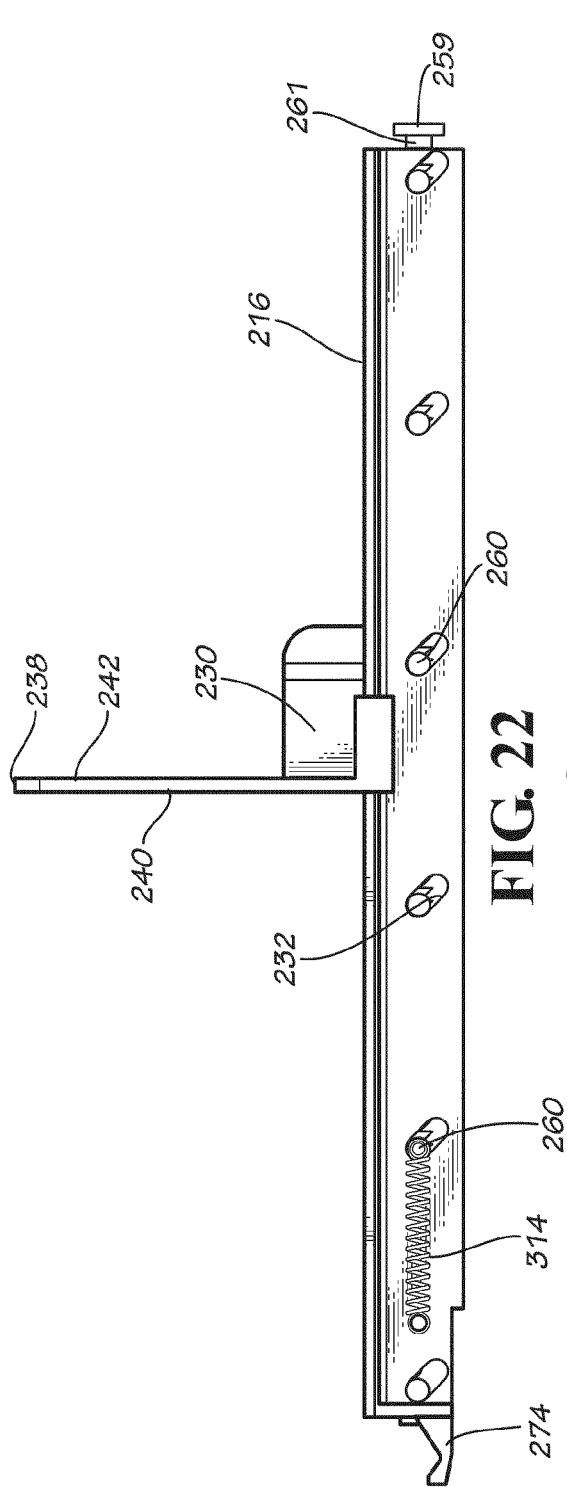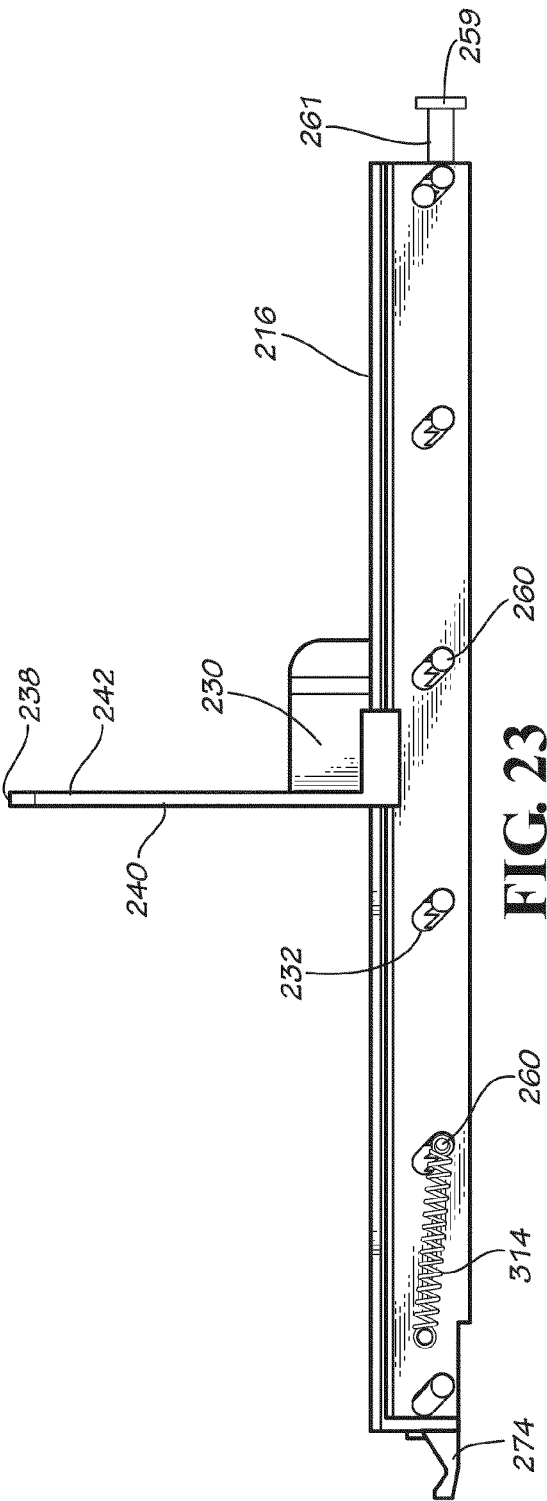

DISPENSING AND DISPLAY SYSTEM

RELATED APPLICATION DATA

This application claims the benefit of U.S. Provisional Application No. 61/100,213, filed Sep. 25, 2008, and U.S. Provisional Application No. 61/183,321, filed Jun. 2, 2009, the entire contents of both of which are hereby incorporated by reference. The present application is a continuation-in-part application of U.S. application Ser. No. 11/528,032, filed Sep. 27, 2006, which claims the benefit of U.S. Provisional Application No. 60/720,823, filed Sep. 27, 2005, and which is a continuation-in-part application of (1) U.S. application Ser. No. 11/409,885, filed Apr. 24, 2006, which claims the benefit of U.S. Provisional Application No. 60/674,880, filed Apr. 25, 2005, and (2) U.S. application Ser. No. 10/967,811, filed Oct. 18, 2004, which claims the benefit of U.S. Provisional Application No. 60/512,454, filed Oct. 17, 2003, the entire contents of all of which are hereby incorporated by reference. The present application is also a continuation-in-part application of U.S. application Ser. No. 11/409,885, filed Apr. 24, 2006, which claims the benefit of U.S. Provisional Application No. 60/674,880, filed Apr. 25, 2005, the entire contents of both of which are hereby incorporated by reference.

FIELD OF THE INVENTION

Embodiments of this invention generally relate to systems for advancing product on a shelf and, in particular, devices that allow for controlled forward movement of product and that are capable of generating and/or analyzing data related to the number of product on the shelf and/or attempts to access the product.

BACKGROUND

Knowledge and analysis of consumer behavior provides valuable insight for retailers, distributors, marketers, and others involved in the sales and distribution of goods and services. Many methods and means of gathering data on consumer activity are known. For example, distributors can develop rough estimates of sales and demand by analyzing the orders they receive. Retailers can estimate sales, demand, and inventory levels from point-of-sale or intelligent cash register systems. Marketers can observe consumer behavior or conduct surveys to gather data on consumer behavior. Such data can help manufacturers, distributors, and retailers make informed decisions about how to supply goods and services, including how much inventory to supply for a particular location and what specific goods or services are appropriate for a location.

Knowledge of inventory levels and consumer behavior can also help manufacturers, distributors, and retailers avoid expenses and costs, as unnecessary expenditures for inventory that may not sell can be avoided, as well as the costs relating to acquiring and housing such inventory. Additionally, real time knowledge of inventory levels can alert retail personnel when a product display is running low so that the retailer can restock the display.

Moreover, theft of small items in retail stores is an all too common problem. Items that are in high demand by thieves include over-the-counter (OTC) products such as analgesics and cough and cold medications, razor blades, camera film, batteries, videos, DVDs, smoking cessation products, infant formula, hair products, body sprays, and other such items. Shelf sweeping is a particular problem for small items. Shelf sweeping occurs when individuals or groups remove all the shelf stock and exit the store, similar to a "smash and grab" shoplifting technique. Shelf sweeping relies on excessive quantities of product being available on the shelf. Retailers must keep substantial inventory on shelf or incur the cost, including labor costs, of constantly restocking.

Retailers are constantly challenged to balance the needs of legitimate consumers' access to high theft items with measures to minimize the incidence of theft. Because theft has become so rampant in certain product categories, such as razor blades and infant formula, many retail stores are taking the products off the shelves and placing them behind the counter or under lock and key. Customers must request the products to make a purchase. This requires additional labor costs to provide individual service to customers who would normally not require it. It also makes it difficult for customers to compare products. Furthermore, it might not be feasible where the space behind the counter is limited and is needed for prescription medications. In some cases, products are simply unavailable due to high pilferage rates. Therefore, a device that minimizes the incidence of product theft by controlling and monitoring access to the product is needed.

Studies have shown that a desirable form of theft deterrence is to cause a time delay between when one product is dispensed and the next product is available for dispensing. Would-be thieves are less likely to steal products if there is a substantial delay between the dispensing of individual products. Another deterrent to theft is alerting retail personnel of attempts to dispense an excessive number of individual products and other suspicious behavior.

Detrimental consumer behavior like shoplifting also can be addressed if appropriate data is available. However, conventional means and methods known today for acquiring and analyzing such data are burdensome, expensive, time-consuming, and/or do not provide real time information, and thus are often not employed. What is needed in the art is a reliable, expedient way to gather and process consumer and/or inventory data so that it can be used to deter theft and make informed inventory decisions.

SUMMARY

Systems according to some embodiments of this invention provide restricted consumer access to product on a retail shelf by controlling advancement of the product on the shelf. Moreover, systems according to some embodiments of this invention are capable of generating and transmitting information relating to: (1) vending of the product, such as the number of product removed from the shelf and/or how many products remain on the shelf, and/or (2) attempts to access the product, such as whether an access door is open or closed and/or for how long the access door has been open.

In some embodiments, as a first product is removed from the shelf, the products located behind the one removed can be, in certain circumstances, advanced forward by a pushing assembly. A pushing assembly of one embodiment of this invention includes a pusher, a track, and a shaft that cooperates with a position sensor. The movement of the pusher to advance product forward causes the shaft to rotate. The position sensor senses the rotation of the shaft and sends a signal, such as in an analog to digital converter or other circuitry, to a processor that can analyze this information. For example, the amount of rotation of the shaft can be used to determine the number of products removed from the shelf and/or the number of products that remain on the shelf.

In some embodiments, the pushing assembly includes a pusher, a track, and a stop. The stop is configured to cooperate with a proximity sensor that senses the proximity of the stop in relation to the sensor when the stop is in an engaged or disengaged position. In some embodiments, the pusher is only permitted to advance product forward when the stop is in the engaged position (for example, when an access door is closed). In other embodiments, the pusher is only permitted to advance product forward when the stop is in the disengaged position (for example, when the access door is closed). The movement of the stop into either its engaged or disengaged position to prevent the pusher from advancing product forward (for example, by opening a door to access the product) can be sensed by the proximity sensor. The proximity sensor can then convey this information for processing, so that it can be determined whether an access door is open and/or for how long the access door has been open.

In some embodiments, the pushing system includes a pusher, a track, a shaft, and a stop. In some embodiments, the pushing system also includes a resistance mechanism that couples to the track and pusher and controls the forward movement of the pusher along the track. In this way, the resistance mechanism controls the speed at which product is advanced for access by the consumer.

BRIEF DESCRIPTION OF THE DRAWINGS

FIG. 22 is a side view of a pushing assembly according to one aspect of the invention, when the stop is in the disengaged position.

FIG. 23 is a side view of the pushing assembly of FIG. 23, when the stop is in the engaged position.

DETAILED DESCRIPTION

Certain embodiments of the invention comprise a pushing assembly 200 for the controlled advancement of product. The pushing assembly 200 is configured to cooperate with mechanisms having data generation capabilities. In some embodiments, it may be desirable to position product close to the edge of a shelf so that a consumer may access the product. As a first product is removed from the pushing assembly, the pushing assembly, in certain circumstances, causes products located behind the one that was removed to move forward. As the pushing assembly causes product to move forward, data is generated about the removal of the product, such as data relating to the number of products that have been removed and/or the number of products remaining on shelf. A pushing system, which accomplishes the forward movement of product, may be configured to interact with components that generate signals conveying information relating to product removal.

Figure 1:
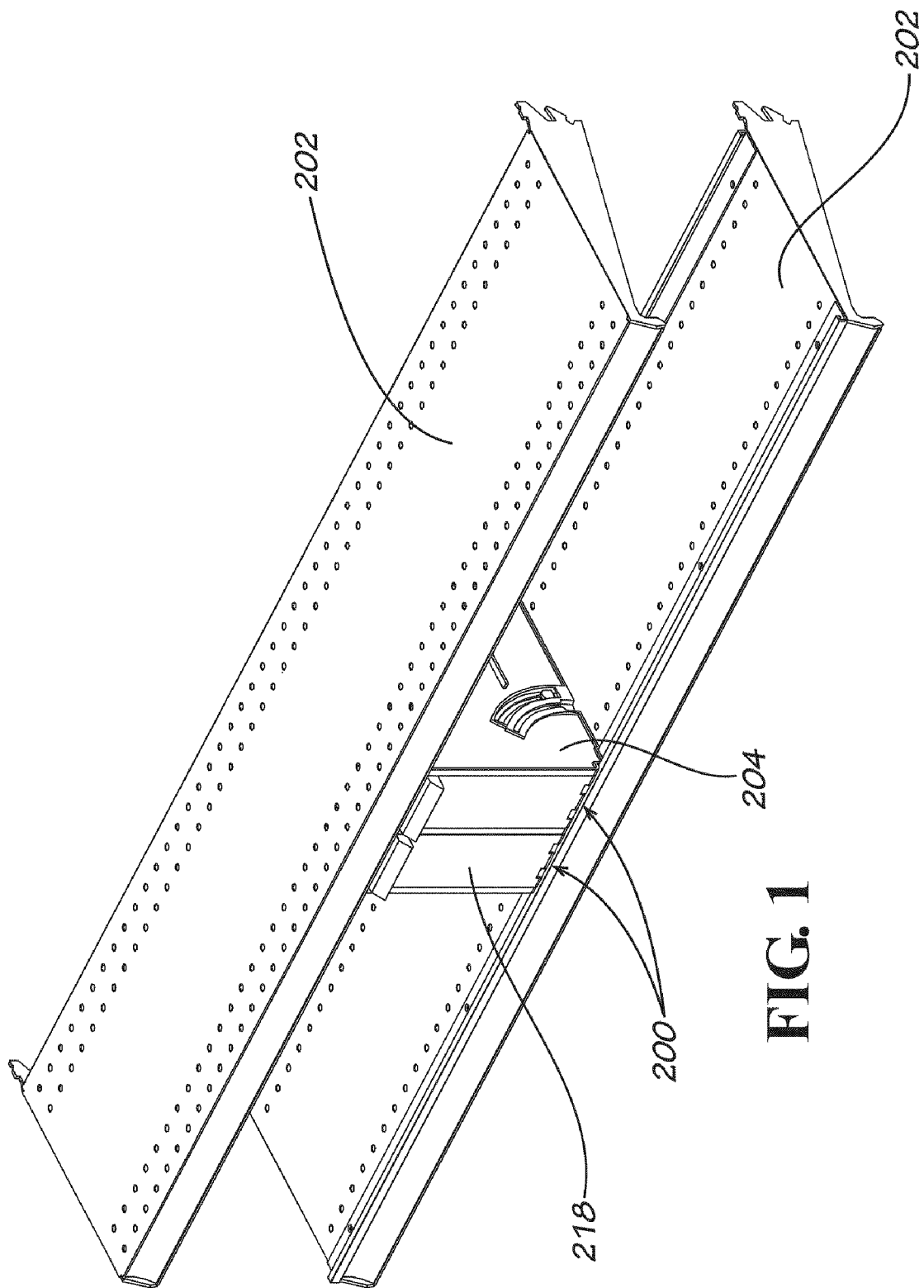
FIG. 1 is a front view of two assembled controlled access devices positioned between shelving units according to one embodiment of the invention.
Figure 2:
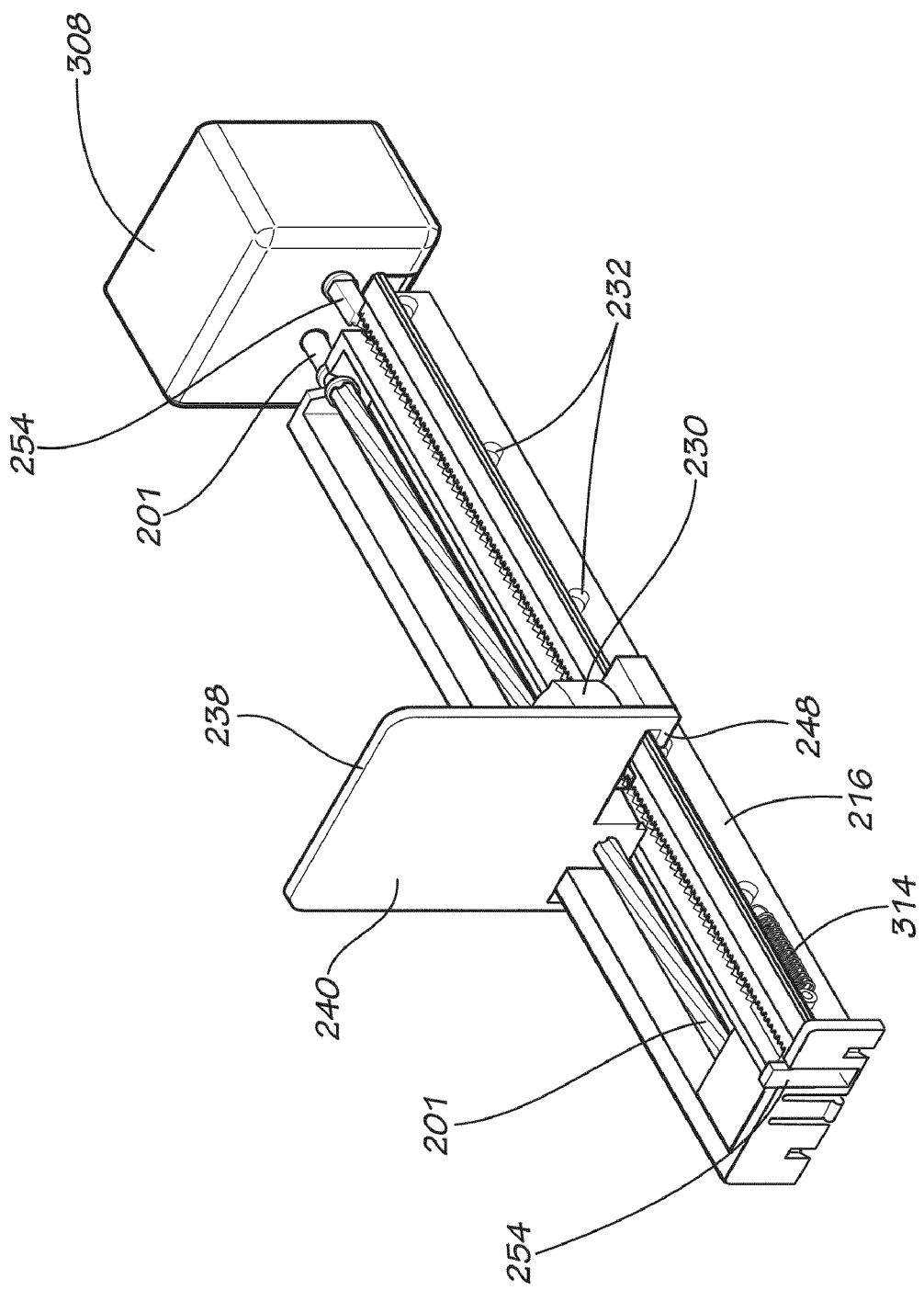
FIG. 2 is a front perspective view of a pushing assembly positioned with respect to an analysis unit according to one embodiment of the invention.

According to one embodiment of the invention, one or more pushing assemblies 200 may be positioned between two retail shelving units 202, as shown in FIG. 1. Alternatively, one or more pushing assemblies 200 may be positioned on a single shelving unit, or placed on any type of surface such as a countertop. As shown in FIG. 2, in some embodiments, pushing assembly 200 comprises a pusher 214, a track 216, a resistance mechanism 230, an optional stop 254, and an optional shaft 201. In some embodiments, pushing assembly 200 is used with a door assembly 218 and/or one or more dividers 204 (FIG. 1). A divider 204 may be positioned on one or both sides of the pushing assembly 200 to separate adjacent assemblies.

Pusher 214 includes a pushing ram 238 that engages product (not shown) and pushes product forward. Pushing ram 238 includes a front surface 240 for engaging product and a rear surface 242. In one embodiment, the pushing ram 238 is a rectangular plate, although other suitable shapes and geometries may also be used.

Figure 3:
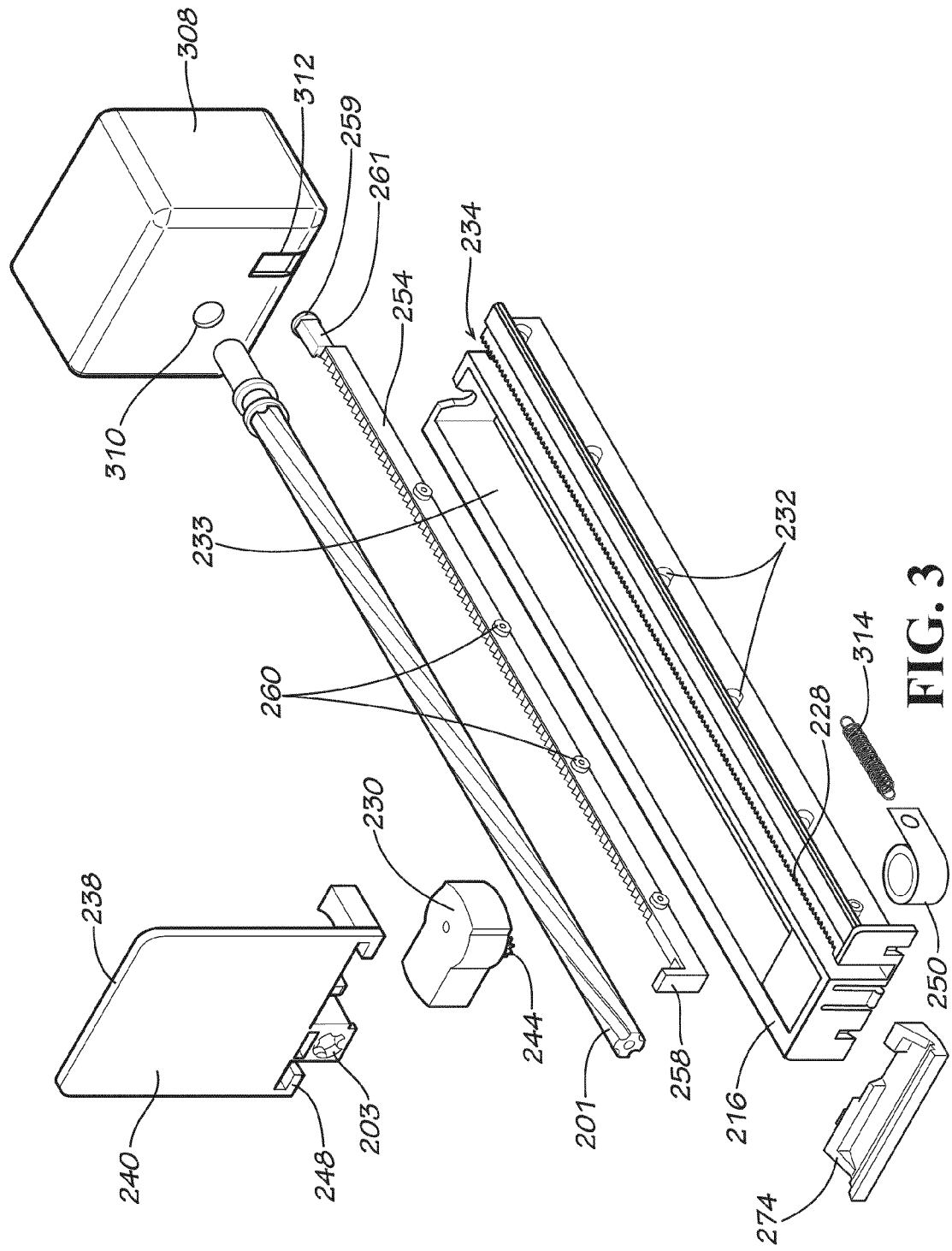
FIG. 3 is an exploded view of the pushing assembly and analysis unit of FIG. 2.

As shown in FIG. 3, extension 248 of pusher 214 extends beyond the bottom portion of pushing ram 238. In this manner, extension 248 engages track 216, so that pusher 214 is in sliding engagement with track 216. In certain embodiments, pushing assembly 200 also includes a shaft 201 (further discussed below) that extends through an aperture 203 in the pusher 214.

Figure 4:
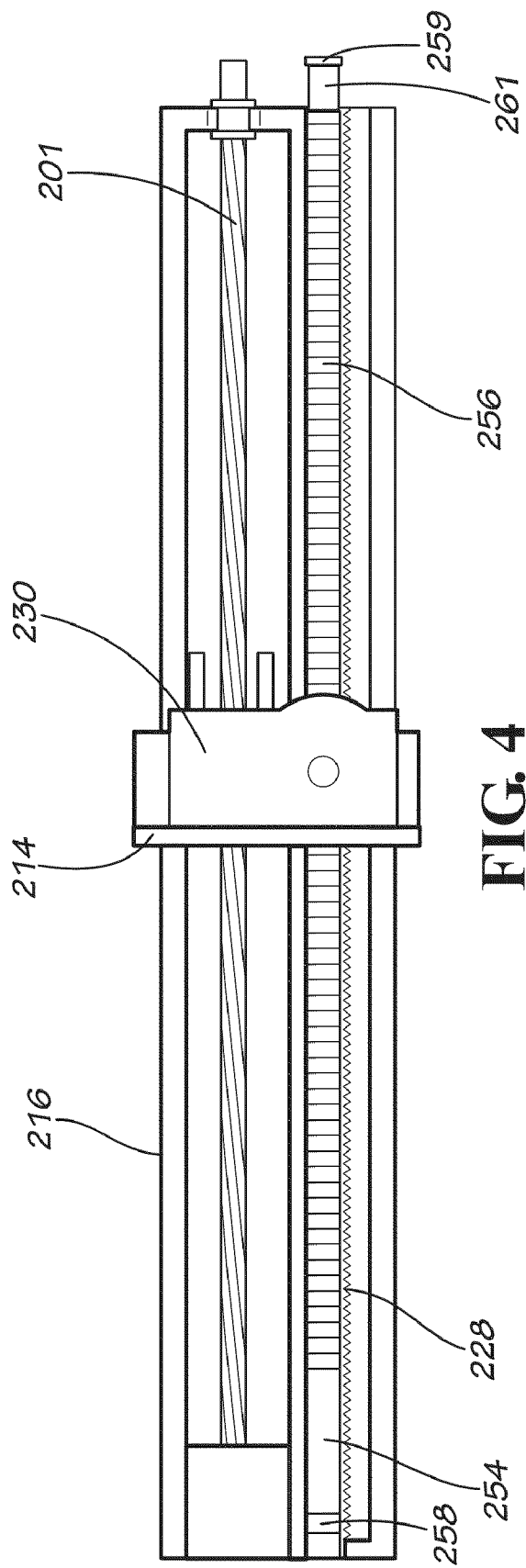
FIG. 4 is a top view of the pushing assembly of FIG. 2, shown in isolation.
Figure 5:
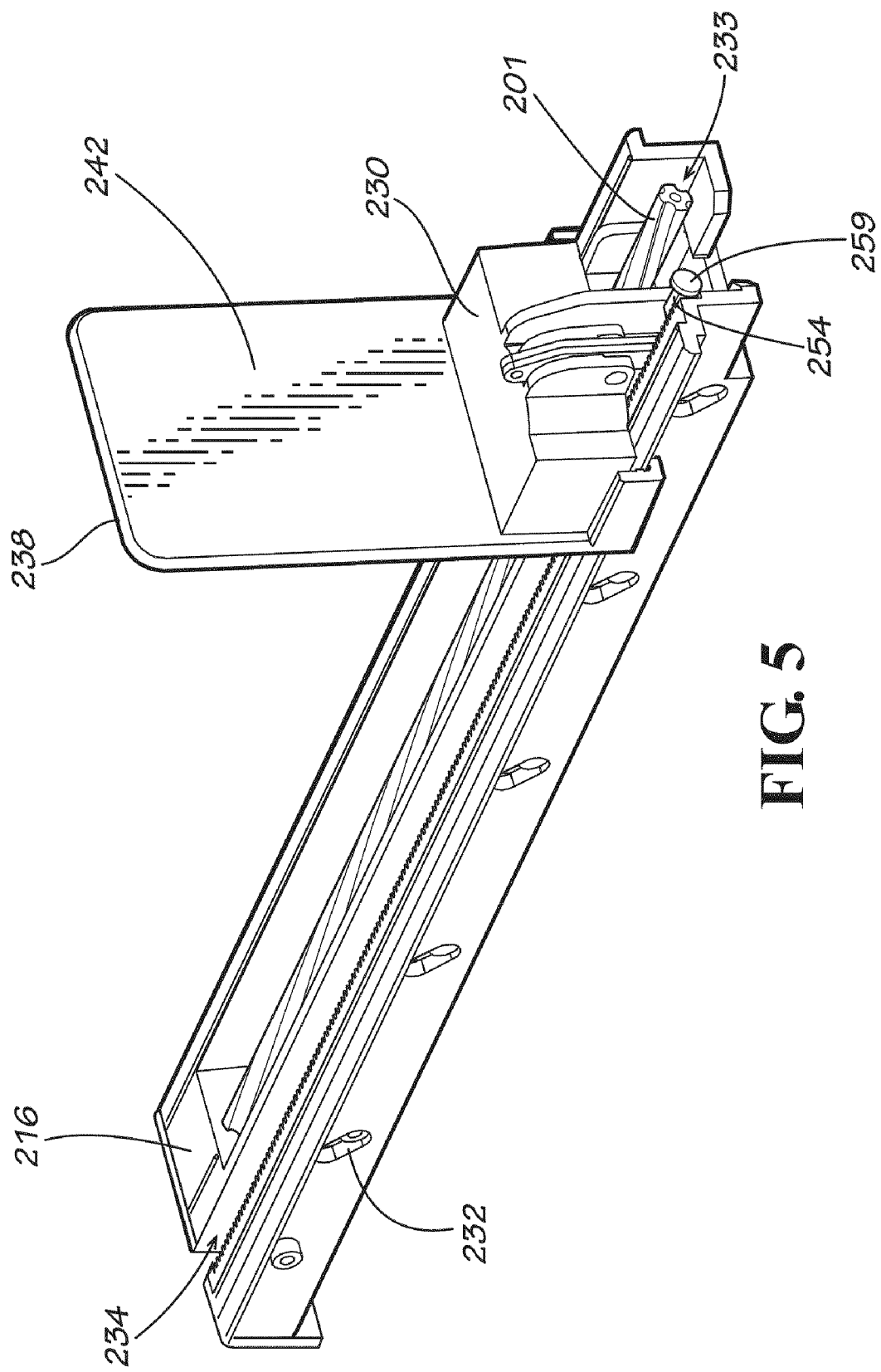
FIG. 5 is a rear perspective view of the pushing assembly of FIG. 4.

As shown in FIGS. 3-4, track 216 includes a shaft channel 233, as well as a resistance channel 234 having gear teeth 228 that project into resistance channel 234 and engage external gear component 244 of the resistance mechanism 230, further described below. The gear teeth 228 may be positioned in various other manners along the resistance channel 234 and maintain the functionality of the device.

Figure 15:
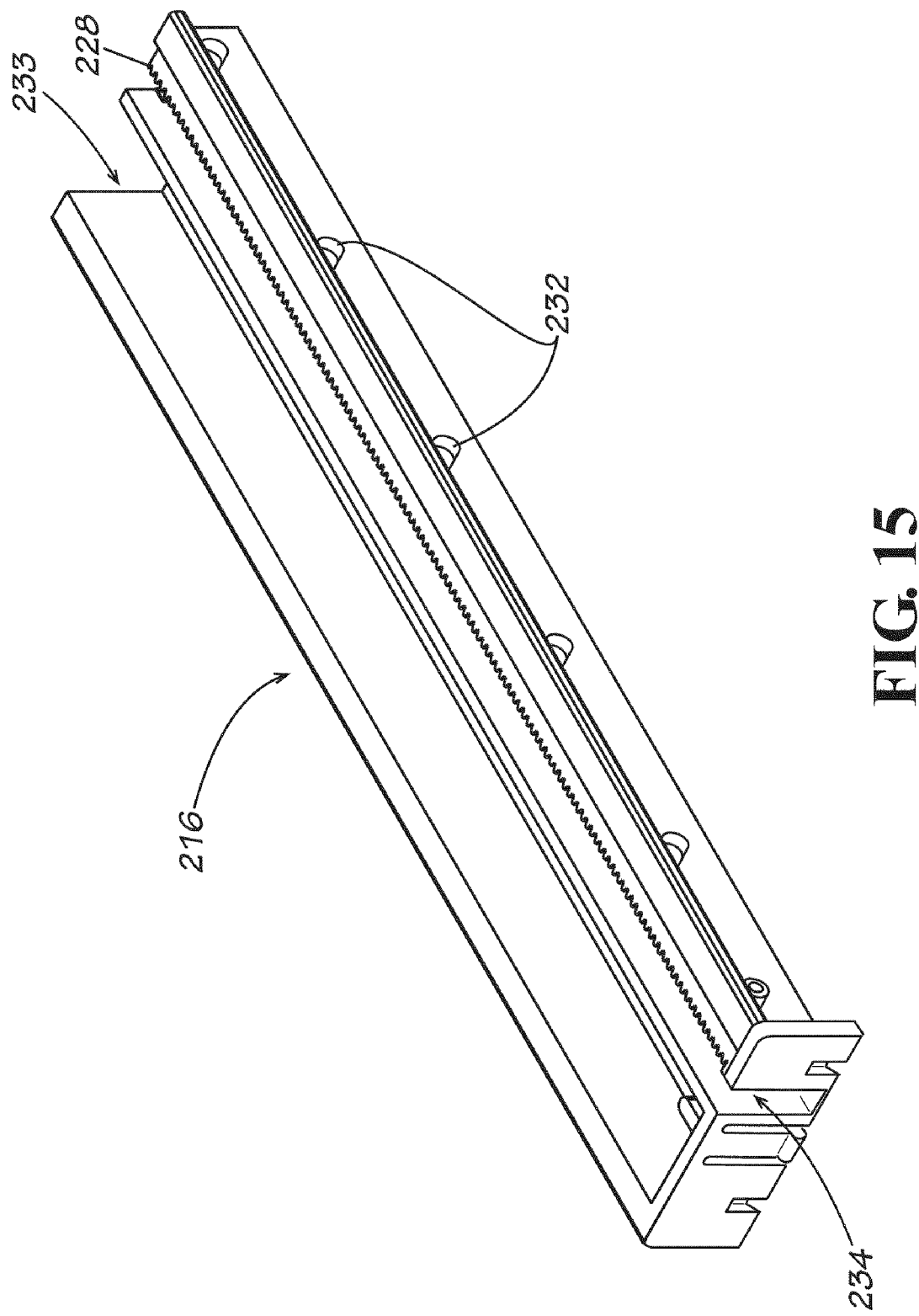
FIG. 15 is a perspective view of a track according to one embodiment of the present invention.
Figure 16:
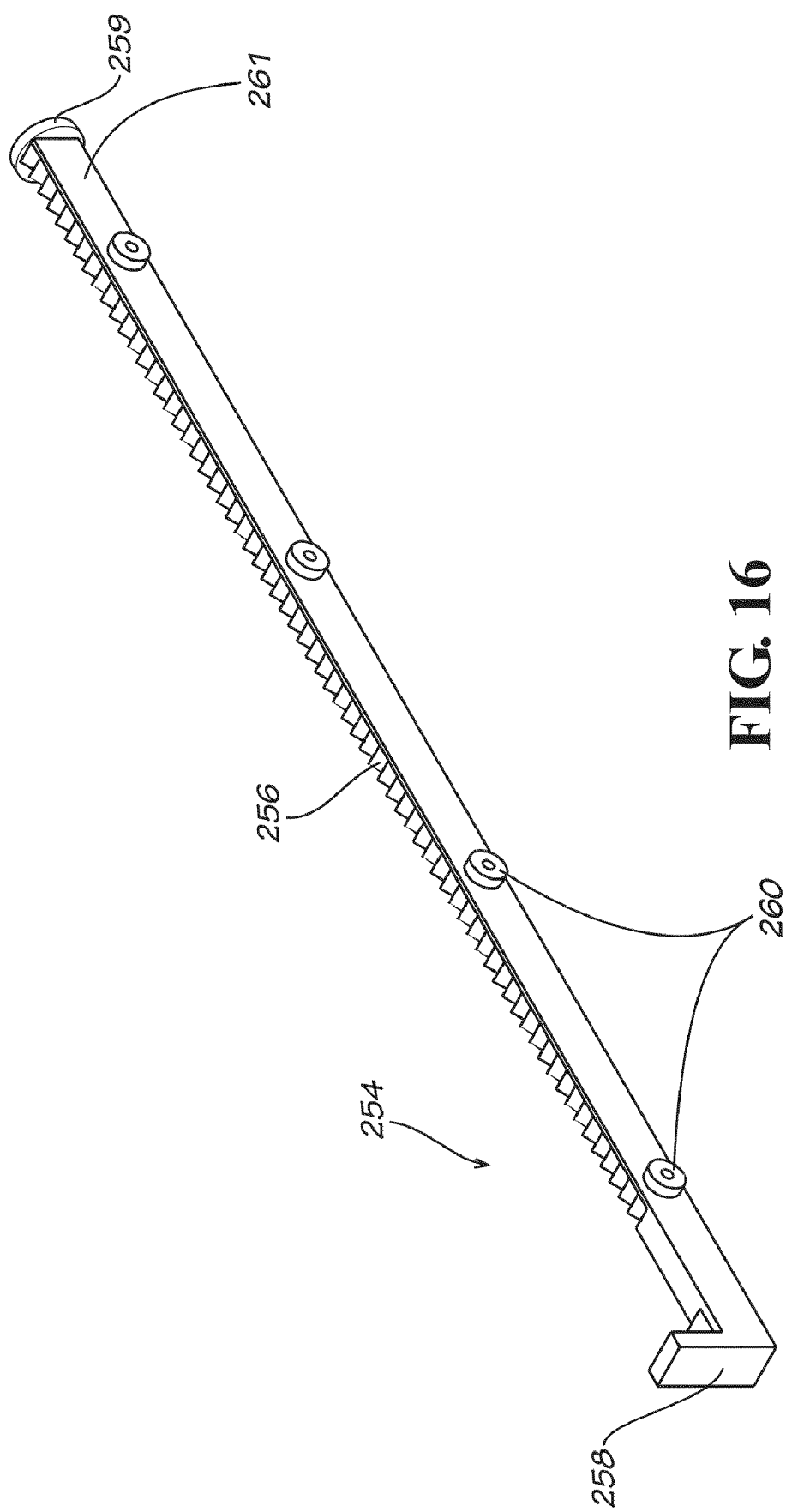
FIG. 16 is a perspective view of a stop according to one embodiment of the present invention.

As shown in FIGS. 2-3, in some embodiments, resistance channel 234 receives stop 254. As shown in more detail in FIG. 16, stop 254 includes a plurality of engagement surfaces 256, which form generally a sawtooth shape in cross section. Stop 254 also includes a front face 258, which may extend beyond the resistance channel 234, and a back portion 261. Engagement surfaces 256 are positioned to engage projections 262 extending from brake 246 of pusher 214 (described below and shown in FIG. 14). Stop 254 also includes one or more protrusions 260, which may be located on the side of stop 254, as shown in FIG. 16. As described below, these protrusions are shaped and sized to fit within one or more slots 232 in the side of track 216 (shown in FIGS. 3, 15, and 22).

Figure 14:
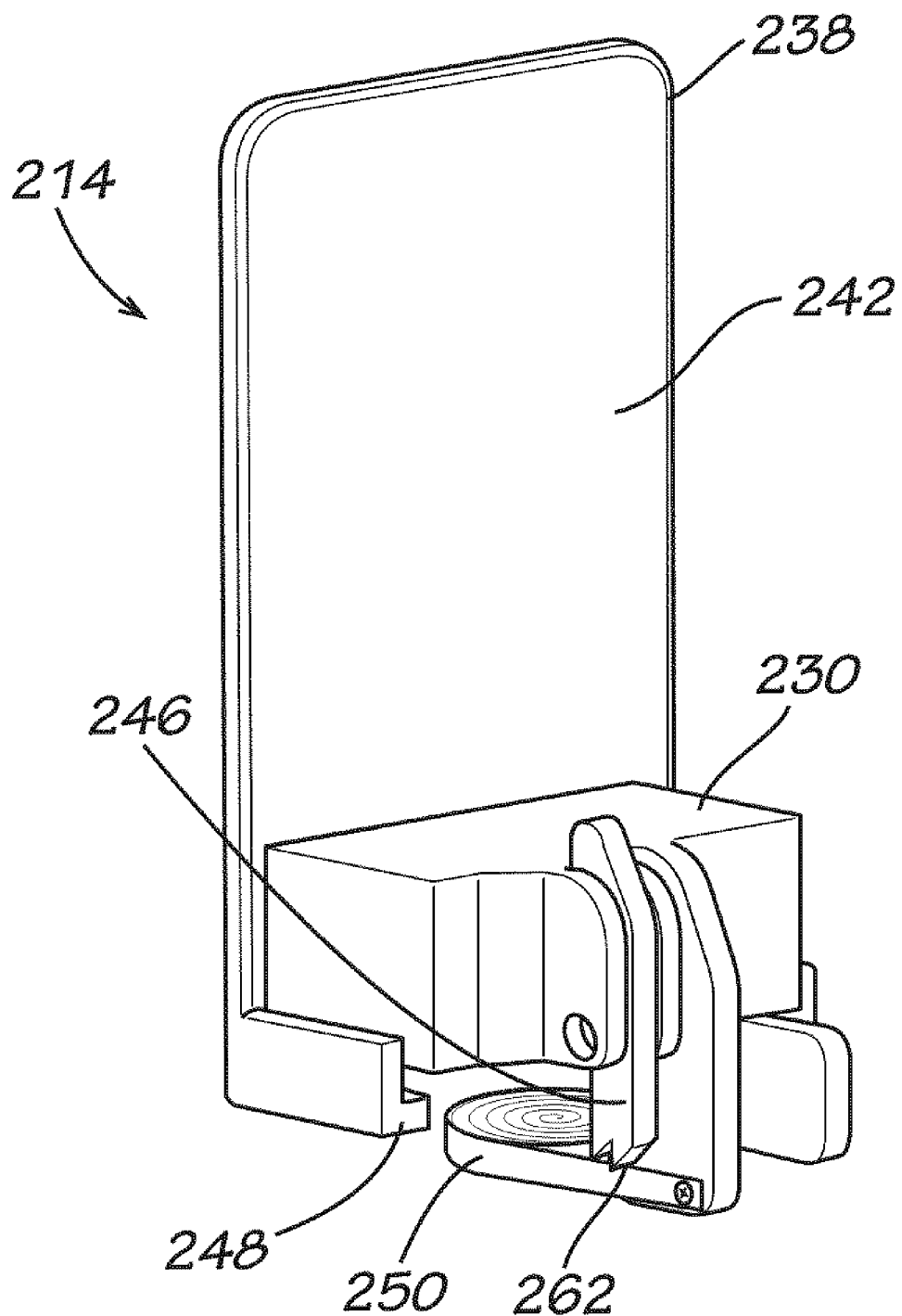
FIG. 14 is a rear perspective view of a pusher according to one embodiment of the present invention.

As shown in FIG. 14, one end of spring 250 is attached to the pusher 214 in any suitable manner, such as, but not limited to, by a screw. Movement of pusher 214 towards the back end of the track 216 unwinds spring 250 so that when released, spring 250 urges pusher 214 in the forward direction. Spring 250 may be positioned anywhere along track in relation to pusher 214, so that spring 250 is capable of either "pushing" or "pulling" pusher 214 forward. The spring preferably may be a constant force spring, such as those sold under the trademark Conforce®, but many other types of springs, such as a variable force spring, may also be used.

Figure 6:
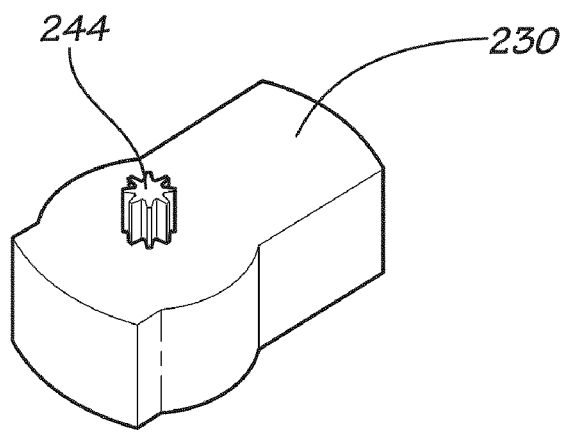
FIG. 6 is perspective view of a resistance mechanism according to one embodiment of the present invention.

In embodiments including a resistance mechanism 230, resistance mechanism 230 is attached to pusher 214. As shown in FIG. 6, resistance mechanism 230 includes external gear component 244. As shown in FIG. 2, resistance mechanism 230 is positioned on pusher 214 so that external gear component 244 extends into resistance channel 234 of track 216 and engages gear teeth 228. According to certain embodiments, one such resistance mechanism is a conventional resistance motor, such as used in toys, such as the resistance motor Model #w217 sold by Vigor, although other types of motors may also be used. In other embodiments, resistance mechanism 230 is a rotary damper.

As one product is selected from the front of pushing assembly 200, the compression of the spring 250 causes the pushing ram 238 to move forward and the external gear component 244 to rotate along gear teeth 228 of track 216. The movement of pushing ram 238 advances remaining product along track 216. The speed of this forward movement is controlled and reduced by resistance mechanism 230. The internal gears of the resistance mechanism 230 are configured to provide resistance to the forward movement by limiting the rotation of the external gear component 244. Because the external gear component 244 engages gear teeth 228 of track 216 and the external gear rotation is limited, the movement of pushing ram 238 and therefore the remaining product to the front of track 216 is slowed.

Product can be loaded in pushing assembly 200 by forcing pushing ram 238 backwards along track 216 and placing multiple units of the product against the pushing ram 238. As described above, spring 250 pulls the pushing ram 238 to exert force on the products towards the front of the track 216. Resistance mechanism 230 preferably allows pushing ram 238 to be forced backwards freely for loading of the product.

In the embodiments having a shaft 201, shaft 201 is configured to rotate as the pusher 214 moves. As shown in FIG. 2 and referenced in FIG. 18, shaft 201 is positioned to engage a position sensor 306, such as a potentiometer or other suitable device, within analysis unit 308 as shaft 201 rotates. In some embodiments, a 270° potentiometer, such as a Panasonic Precision potentiometer, is used as position sensor 306, but any other suitable position sensor can be used. Shaft 201 may be helix shaped and is positioned in relation to track 216 so that the shaft 201 is free to rotate without obstruction. As shown in FIG. 3, pusher 214 includes an aperture 203 cut in a shape corresponding to the shape of shaft 201 (i.e., helix geometry plus a small amount of tolerance if the shaft 201 is helix shaped) so that when the pusher 214 moves in a forward or backward direction, the linear motion of pusher 214 is converted into a rotary motion of the shaft 201.

Figure 7:
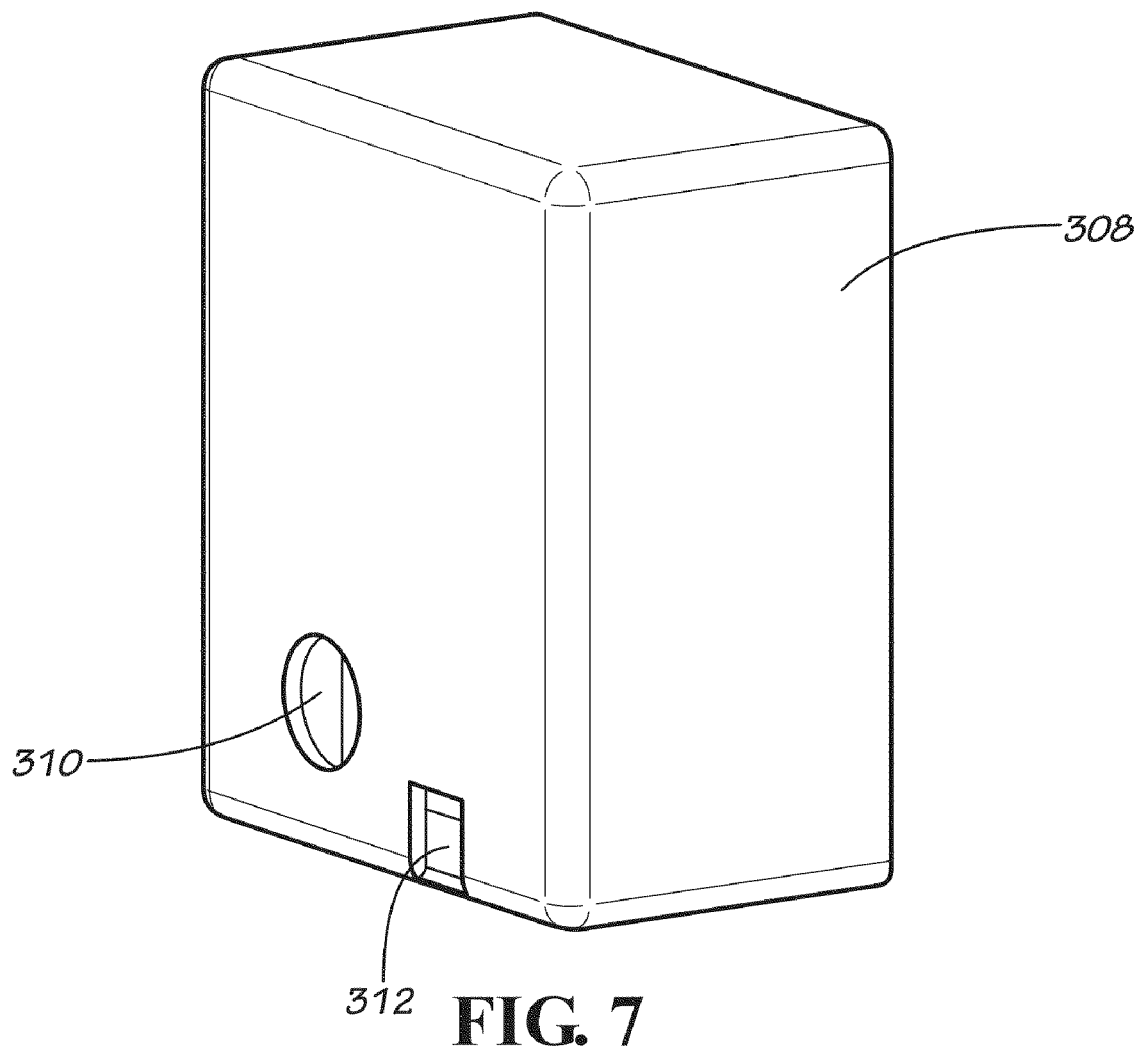
FIG. 7 is a perspective view of an analysis unit according to one embodiment of the present invention.
Figure 8:
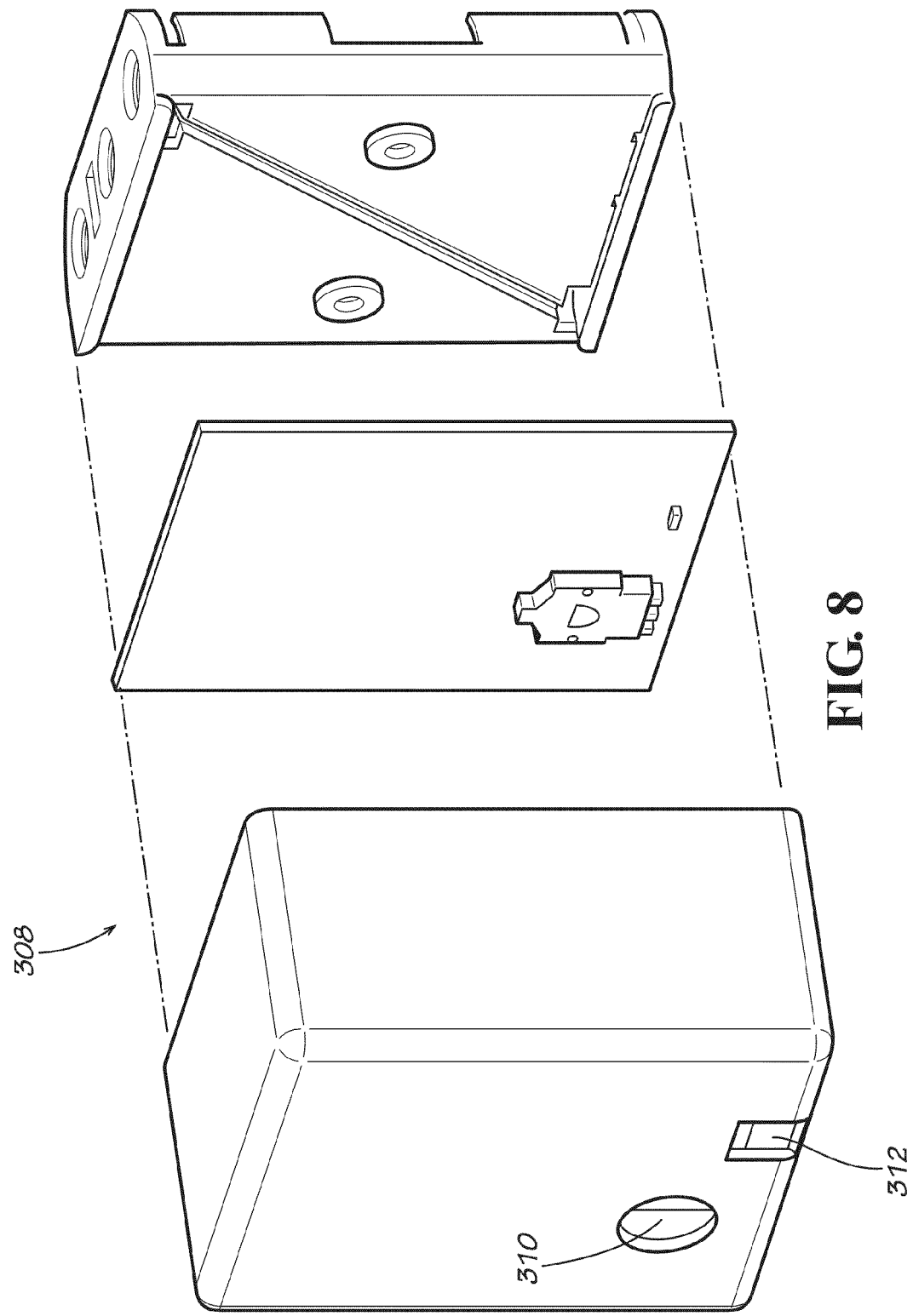
FIG. 8 is an exploded view of the analysis unit of FIG. 7.

Shaft 201 is the positioned with respect to an electronic assembly, such as an analysis unit 308. As shown in FIGS. 3 and 7, analysis unit 308 includes an opening 310 that receives shaft 201 so that shaft 201 engages one or more components on a circuit board, such as a potentiometer or other position sensor 306 that is located inside the analysis unit 308 and that contains, among other things, proximity sensor 300.

Figure 18:
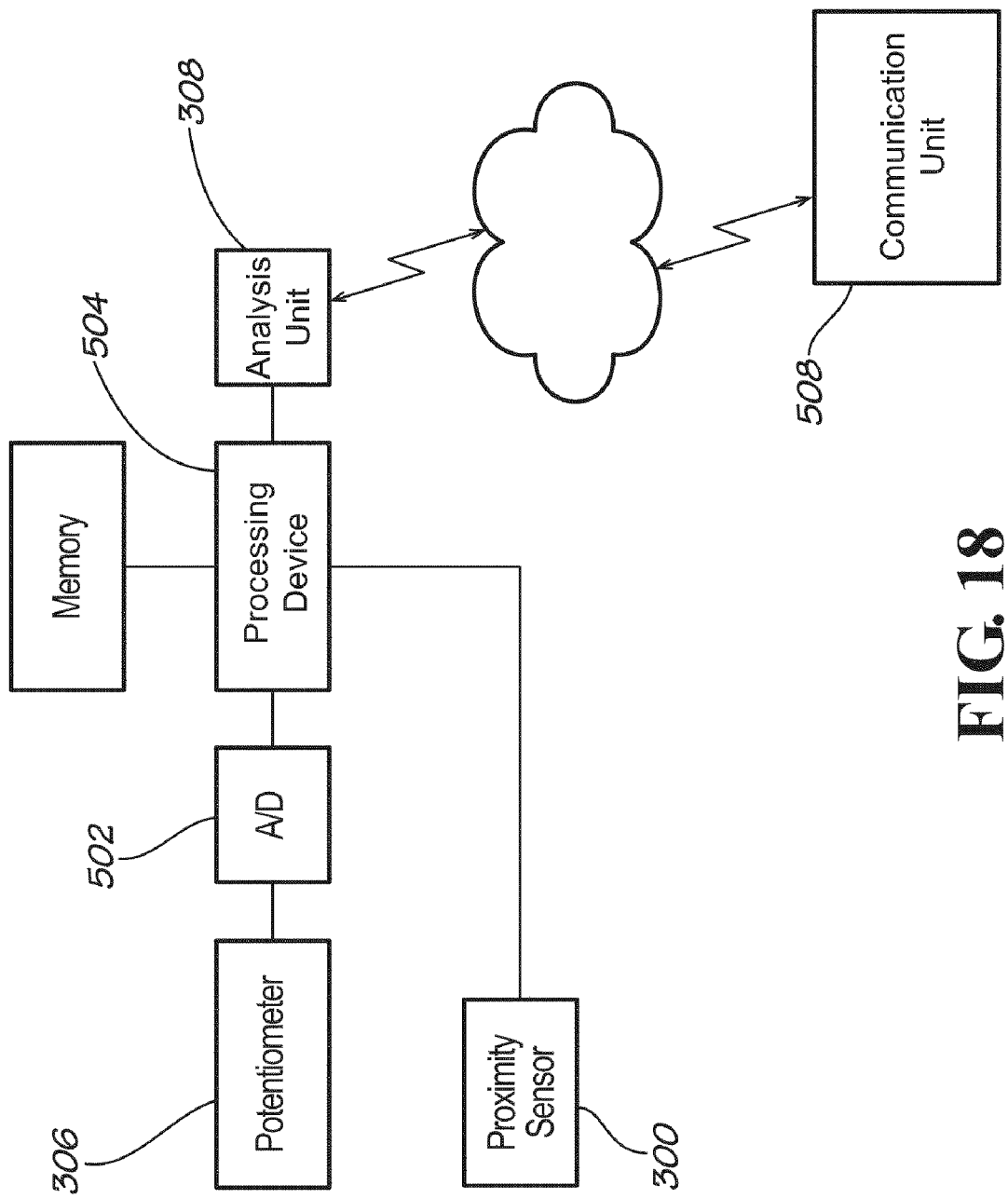
FIG. 18 is a function block diagram of a circuit according to one embodiment of the present invention.

Referring to FIG. 18, position sensor 306 generates a signal by converting the rotation data of shaft 201 into a predetermined voltage output. Optionally, the position sensor 306 can be fed with a precision voltage reference. This voltage reading can be sent through an analog to digital converter 502. This value can then be processed by an appropriate processing device 504 (such as ST 8-bit microcontroller or other suitable processor) and converted via an algorithm to a distance measurement that can then be associated with the dimensions of the product housed on the track. In other embodiments, a processing device is not necessary and a counter may incrementally adjust based on the degree of rotation. In the embodiments where a processing device 504 is used, the processing device can encrypt and package the data it generates and send the data via analysis unit 308 by RF to a communication unit 508. In some embodiments, analysis unit 308 is a wireless analysis unit 308. In some embodiments, the communication unit 508 can send back an acknowledgement in the form of a checksum. The communication unit 508 unpackages the information it receives from the analysis unit 308 and processes it to track, for example, occurrences such as when a product has been removed, the number of products that have been removed from the shelf, the number of products that remain on the shelf, consumer buying patterns, and/or possible theft.

In some embodiments, as shown in FIGS. 2-5 and 16, pusher assembly 200 includes a stop 254 that prevents the pusher 214 from advancing product forward when the stop is in a disengaged position. When stop 254 is in the disengaged position, the engagement surfaces 256 of the stop 254 engage the projections 262 of the brake 246 (shown in FIG. 14) that extend into resistance channel 234. When projections 262 of the brake 246 engage the engagement surfaces 256 of the stop 254, stop 254 prevents forward movement of the pusher 214. As shown in FIGS. 3 and 16, the back portion 261 of stop 254 includes a magnet 259, or other suitable mechanism for interacting with a proximity sensor 300, described further below. The back portion 261 of stop 254 is positioned with respect to an electronic assembly, such as analysis unit 308 described above and shown in FIGS. 3, 5, and 7-8. Specifically, as shown in FIGS. 3 and 7, analysis unit 308 can include a second opening 312 that can receive the back portion 261 of stop 254 so that stop 254 interacts with a component on an electronic circuit board located inside analysis unit 308. Such a component can be a Hall-Effect proximity sensor, such as an Allegro Hall-Effect sensor or any other desirable proximity sensor.

In some embodiments, when engaged, stop 254 allows the pusher 214 to move in a forward direction and thus advance product forward. In some embodiments, when stop 254 is engaged, the pusher 214 can move in increments of a predetermined amount, such increments corresponding to the depth of the product. As explained above, the stop 254 includes engagement surfaces 256 that form generally a sawtooth shape in cross section. Stop 254 is positioned within resistance channel 234 so that protrusions 260 of stop 254 are received in ramped slots 232 on the side of the track 216 (shown in FIGS. 2-3 and 15). When stop 254 is in a disengaged position, shown in FIG. 22, protrusions 260 of the stop are located at one end of the slots 232. When sufficient force is applied to the front face 258 of the stop 254, the protrusions 260 on the side of the stop 254 move from one end of slots 232 to the other end of slots 232. Because slots 232 are sloped at an angle along track 216, the application of the force to the front face 258 of stop 254 moves protrusions 260 downward in slots 232, as shown in FIG. 23. In this way, when horizontal force is applied to the front face 258 of stop 254, stop 254 moves both horizontally toward the rear of the track 216 and downward at the same time. When stop 254 is thus lowered to the engaged position (FIG. 23), the engagement surfaces 256 of the stop 254 are lower so that they no longer engage with the projections 262 of the brake 246 that extend into resistance channel 234. When projections 262 of the brake 246 thus disengage the engagement surfaces 256 of the stop 254, stop 254 no longer prevents forward movement of the pusher 214. Spring 314 (shown in FIGS. 3, 22-23) may be used to slow the speed at which stop 254 returns to its disengaged position; this speed can be adjusted to correspond to the amount of time needed for the pusher 214 to move a predetermined increment, such increment corresponding, for example, to the depth of one product.

Back portion 261 of stop 254 is positioned relative to proximity sensor 300 housed within analysis unit 308, as shown in FIGS. 2-3. When the stop 254 is moved into the engaged position and thus positioned toward the rear of the track 216, the back portion 261 of stop 254 (and thus magnet 259 or other suitable mechanism) moves toward the rear of track 216 and closer to proximity sensor 300. Proximity sensor 300 is capable of sensing this proximity of stop 254. In this way, proximity sensor 300 is capable of receiving information corresponding to the proximity of stop 254 in relation to proximity sensor 300. Proximity sensor 300 can be a Hall-Effect sensor, a capacitive sensor, an inductive sensor, a photoelectric sensor such as infrared or ultraviolet devices, or any other passive or active monitor or device capable of sensing the contact of, force imparted by, or presence of nearby objects.

Figure 9:
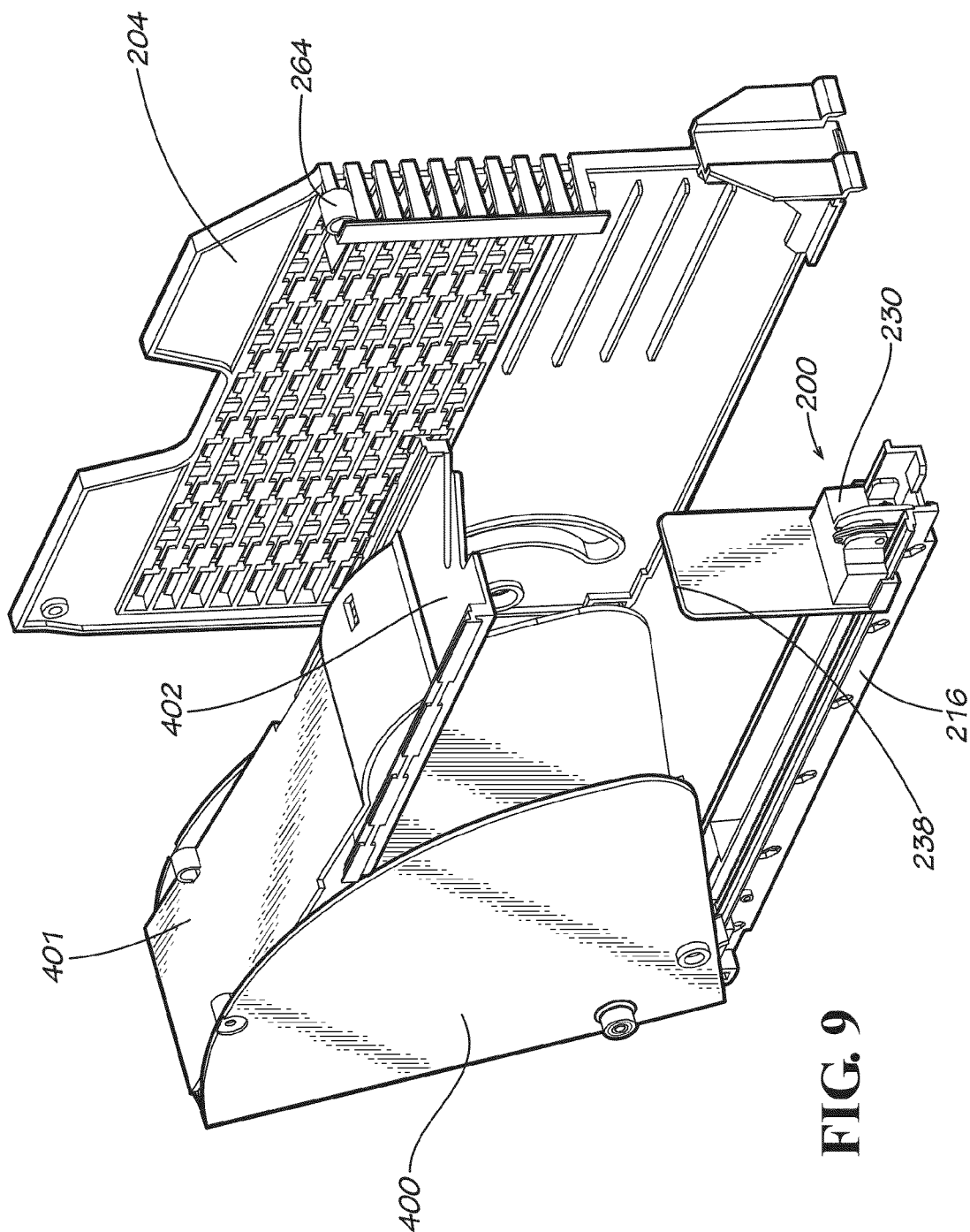
FIG. 9 is a perspective view of a tip bin door assembly, shown positioned with respect to a divider and a pushing assembly, according to one embodiment of the present invention.
Figure 10:
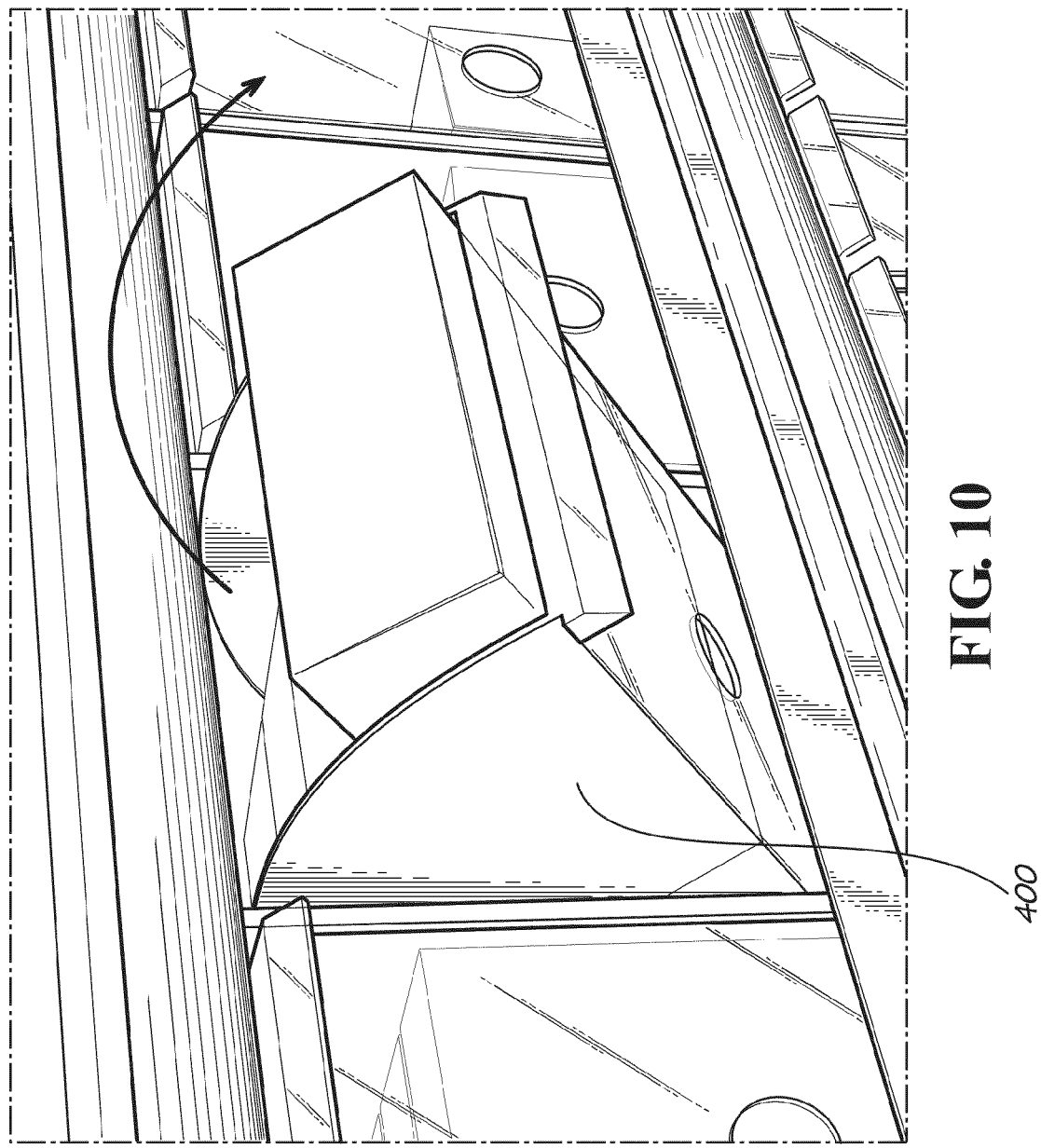
FIG. 10 is another perspective view of a tin bin door assembly, as assembled between shelving units and being opened for vending, according to one embodiment of the present invention.
Figure 11:
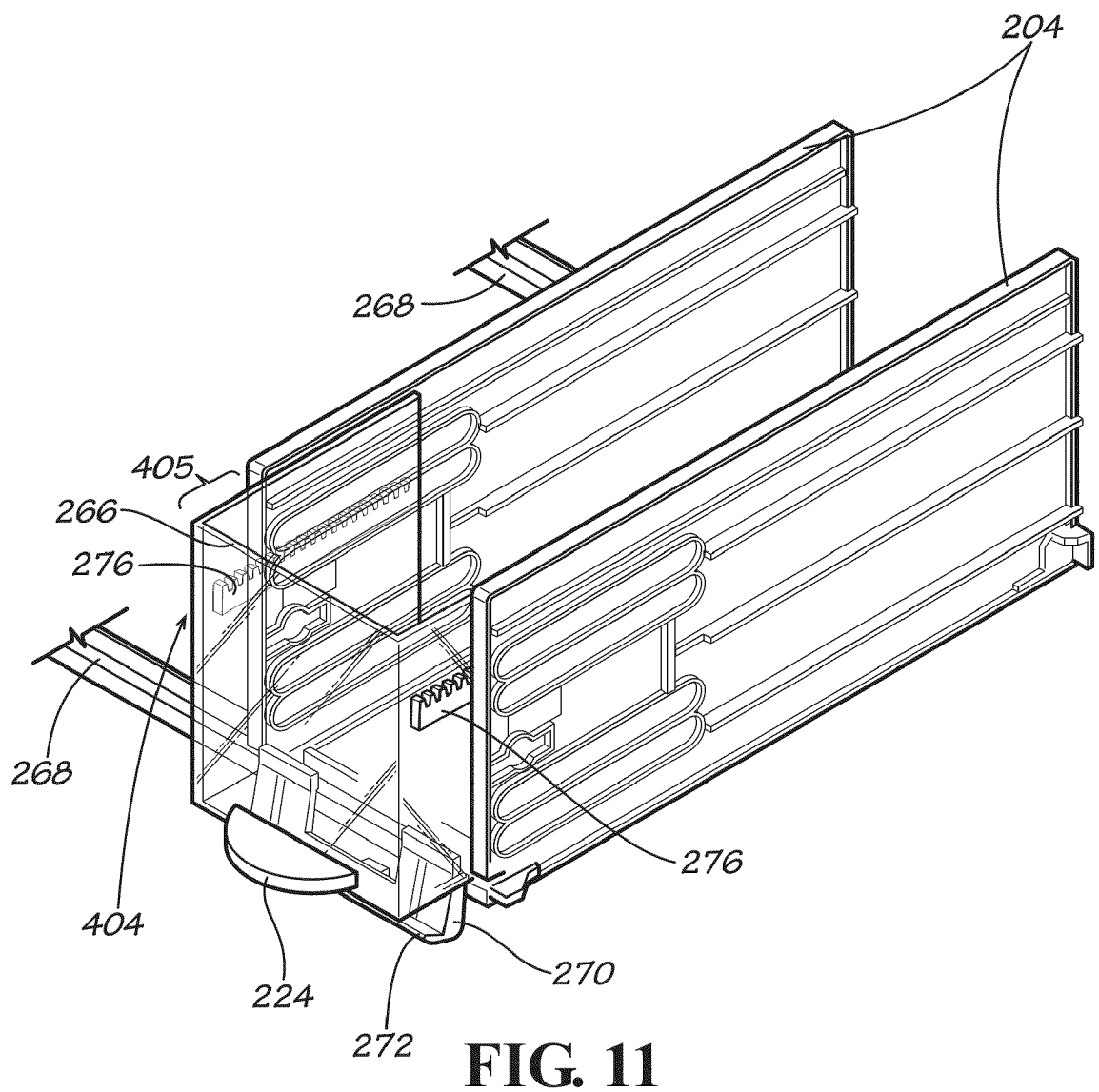
FIG. 11 is a perspective view of a shuttle style door assembly according to one embodiment of the present invention, when the shuttle style door assembly is in the open position.
Figure 12:
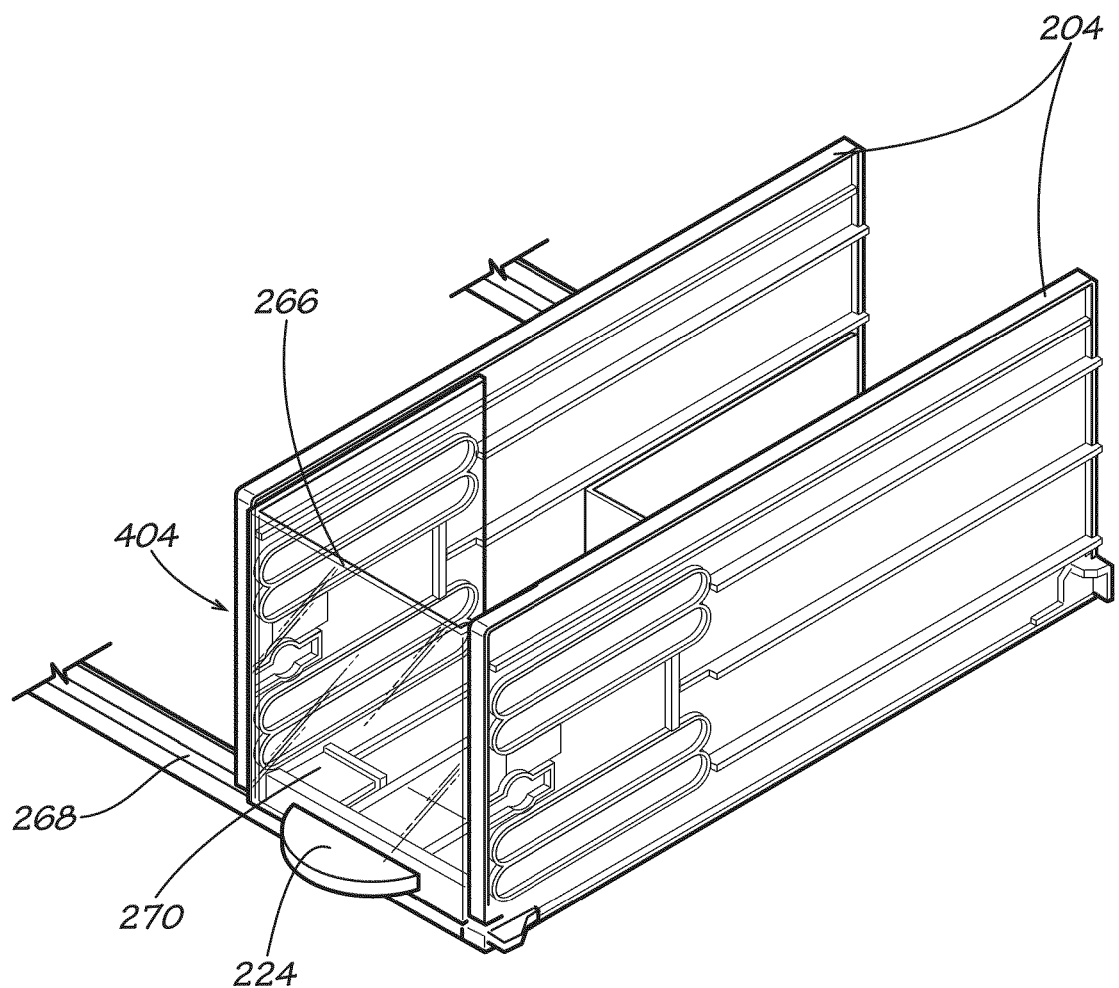
FIG. 12 is a perspective view of the shuttle door assembly of FIG. 11, when in the closed position.
Figure 13:
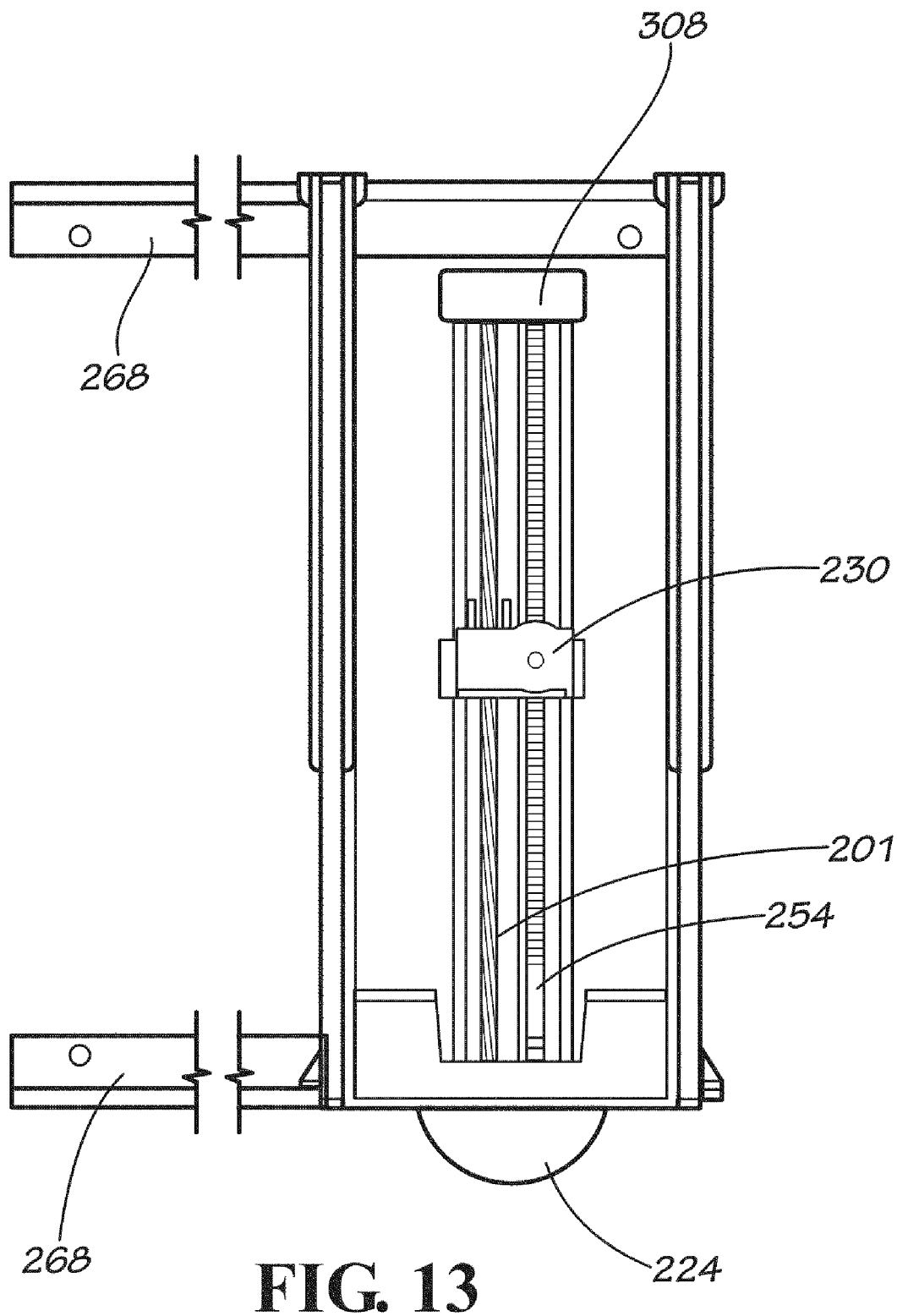
FIG. 13 is a top view of the shuttle door assembly of FIG. 11, as assembled with a pushing system.
Figure 21:
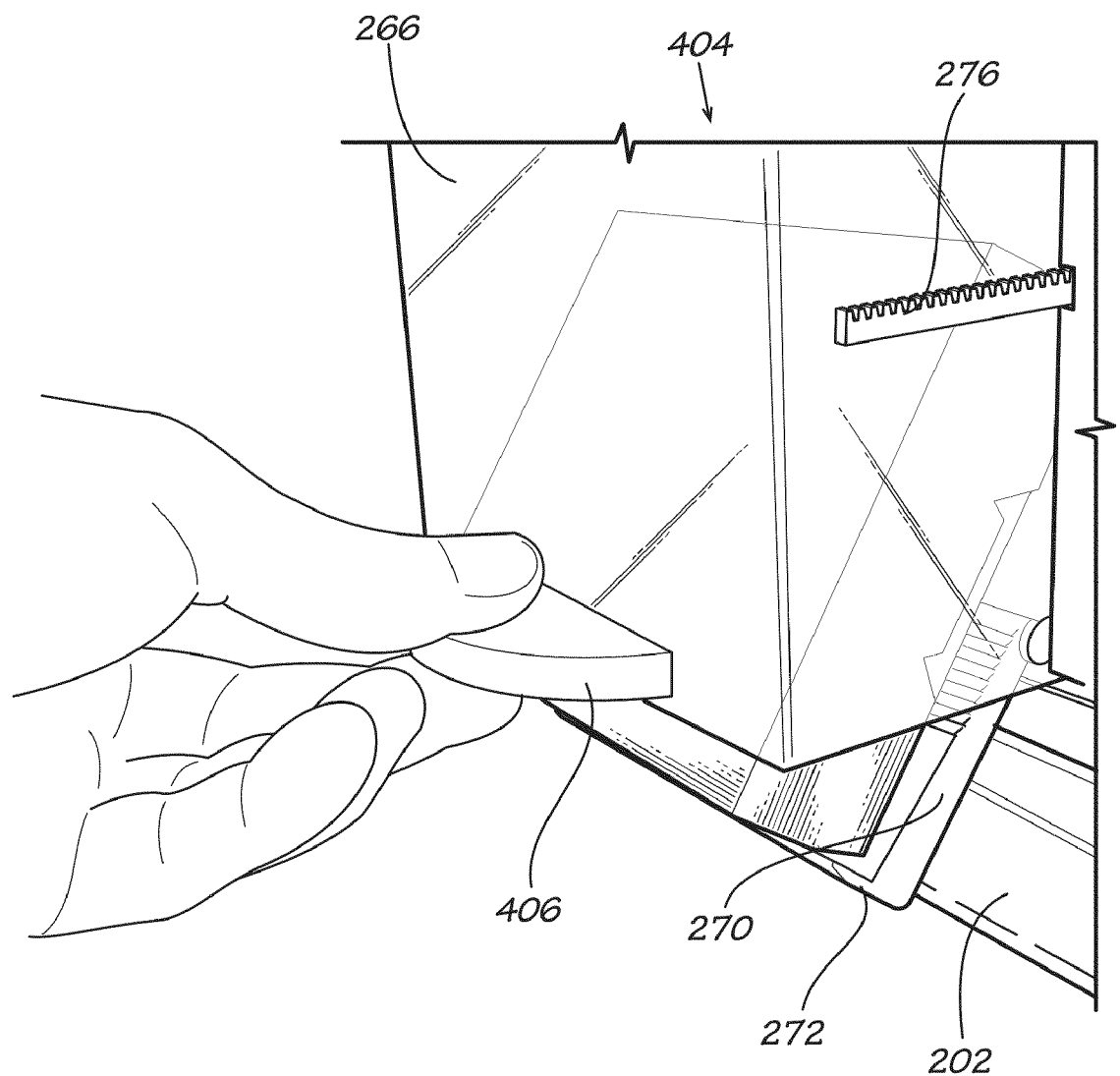
FIG. 21 is a perspective view of a shuttle style door assembly according to one embodiment of the present invention, as the shuttle style door assembly is being opened.

In some embodiments, the pushing assembly 200 may be assembled with a door assembly 218, or other suitable structure, that blocks access to the product when the door assembly 218 is in the closed position. The door assembly may be a tip bin style door 400, as shown in FIGS. 9-10, a shuttle style door 404, as shown in FIGS. 11-12 and 21, or any other suitable door structure. The door assembly 218 is configured to cooperate with stop 254 so that when the door assembly 218 is closed, the door assembly 218 applies sufficient force to engage the stop 254 into its engaged position to allow forward movement of the pusher 214. Because stop 254 cooperates with door assembly 218, when proximity sensor 300 senses a change in the position of stop 254, proximity sensor 300 also generates a digital signal conveying whether the door assembly 218 is open or closed, and how long door assembly 218 has been open or closed. This information can then be sent to a processing device 504, such as an ST 8-bit microcontroller or other suitable processor mentioned above. As mentioned above, the processing device 504 can then encrypt and package the data and send it via analysis unit 308 by RF to a communication unit 508. In some embodiments, the communication unit 508 can send back an acknowledgement in the form of a checksum. The communication unit 508 unpackages the information it receives from the analysis unit 308 and can then analyze and, in some circumstances, act on the information.

For example, in some situations, it may be desirable to alert retail personnel when a consumer opens door assembly 218 for vending. Once the communication unit 508 receives and processes the signal relaying information that the door assembly 218 is open, the communication unit 508 can use this information, for example, to deter theft by monitoring access to the device. In one instance, the communication unit 508 can alert retail personnel that a device's door assembly 218 has been opened by making an announcement over the store's public address ("PA") system or interrupting music playing over the store's PA system with a beep, ping, or other sound that lets store personnel know that an access door has been opened and that product is being vended. If the door assembly 218 has been open too long, the communication unit 508 can also transmit to retail personnel a customer service message over the store's PA system that a customer requires assistance in a particular department. This type of monitoring can help deter theft. In other situations, the communication unit 508 can process a signal that door assembly 218 has been open for a long enough period of time to suggest that the unit might have malfunctioned.

Figure 17:
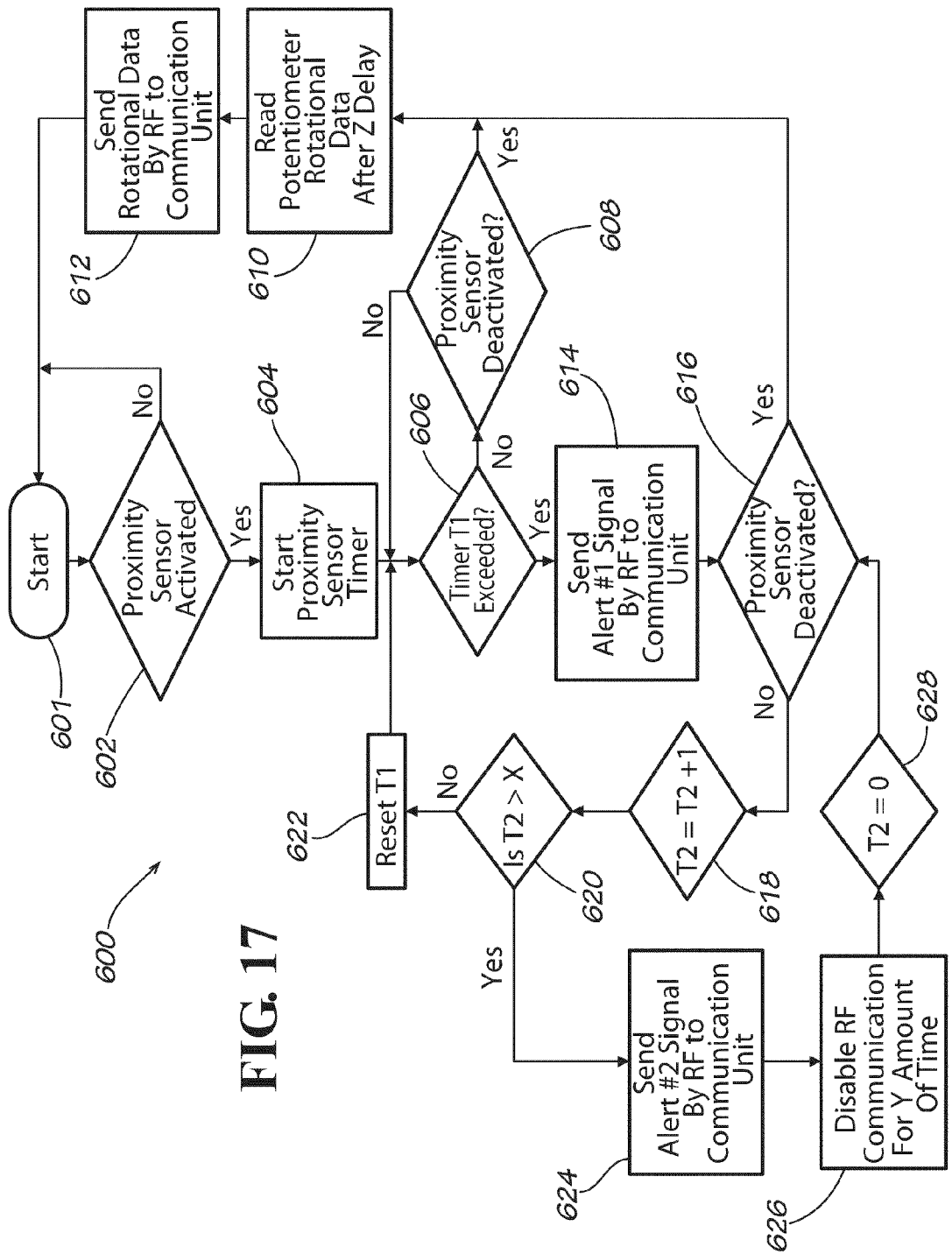
FIG. 17 is a process flow illustrating one non-limiting example of the logic that could be carried out by the analysis unit to collect and process data according to one embodiment of the present invention.

FIG. 17 illustrates one example of a process flow 600 as one of many possible ways to carry out the processes in processing device 504. For example, in the embodiment shown in FIG. 17, processing device 504 begins at 601 and proceeds to decision block 602 to determine whether a proximity sensor 300 has been activated. If not, the processing device 504 returns to decision block 601. If a proximity sensor 300 has been activated, the processing device 504 proceeds to 604 and starts a proximity sensor timer. The processing device 504 then determines at decision block 606 whether a timer $T_1$ (which corresponds to any predetermined variable of time) has been exceeded. If the predetermined variable of time of timer $T_1$ has not been exceeded, the processing device 504 proceeds to decision block 608 to determine whether the proximity sensor 300 has been deactivated. If the proximity sensor 300 has been deactivated, the processing device 504 at 610 reads the potentiometer rotational data after a delay of Z (which can be any predetermined amount of time). The processing device 504 then (at 612) sends the rotational data by RF to communication unit 508, and returns to 601. If the proximity sensor 300 had not been deactivated (608), the processing device 504 loops back to decision block 606 to determine whether timer $T_1$ has been exceeded. If timer $T_1$ has been exceeded, the processing device 504 sends (at 614) a first alert signal by RF to the communication unit 508. Timer $T_1$ can be set to 0, for example, if it is desired that an alert signal be sent every time proximity sensor 300 is activated (for example, every time door assembly 218 is opened). In other situations, timer $T_1$ is set to correspond to the time it takes to open and close the door assembly 218 in normal vending situations, such as when a legitimate consumer removes one product. The processing device 504 then proceeds to decision block 616 to determine whether the proximity sensor 300 has been deactivated. If the proximity sensor 300 has been deactivated, the processing device 504 proceeds to action block 610 and proceeds as described above. If the proximity sensor 300 has not been deactivated, the processing device 504 proceeds to action block 618 and adds one iteration to counter $T_2$, which is initially set to 0. Processing device 504 then proceeds to decision block 620 to determine whether counter $T_2$ is greater than X (which can be any predetermined amount of time). In some embodiments, X corresponds to an amount of time that indicates the door assembly 218 may have malfunctioned. If $T_2$ is less than X, the processing device 504 proceeds to 622 and resets timer $T_1$ and loops back to decision block 606 to proceed as described above. If $T_2$ is greater than X, the processing device 504 proceeds to action block 624 and sends a second alert signal by RF to communication unit. The processing device 504 then proceeds to action block 626, where it disables RF communication for a predetermined amount of time Y, and then proceeds to action block 628, where it resets $T_2$ to 0. Processing device 504 then returns to decision block 616 and proceeds as described above.

In certain embodiments, as shown in FIGS. 9-10, door assembly 218 is a tip bin style door 400 that pivots open to provide a consumer with access to the product. When tip bin door 400 is in a closed position, access to product located behind the door is blocked to a consumer. In some embodiments, when tip bin door 400 pivots forward, tip bin door 400 allows access to the forward-most product on the pushing assembly 200, but includes a cover comprised of pivoting roof 401 and sliding roof 402 that both pivots and slides to prevent access to remaining product housed in the pushing assembly 200.

In other embodiments, as shown in FIGS. 11-12, door assembly 218 is a shuttle door 404 that includes a shuttle 270. When shuttle door 404 is in a closed position (FIG. 12), access to product located behind the front face 266 of shuttle door 404 is blocked to a user. When shuttle door 404 is in the closed position, as shown in FIG. 12, the shuttle 270 is in a substantially horizontal orientation. The shuttle 270 is positioned relative to the pushing assembly 200 so that product located in the forward-most position relative to the pushing assembly 200 rests on the shuttle 270 when the shuttle door 404 is in the closed position, as shown in the figures. Shuttle 270 also includes a lip 272 (shown in FIG. 11).

Shuttle door 404 further may include a ledge 224, which is accessible to a user. When a user pulls ledge 224 to open shuttle door 404, a front face 266 of shuttle door 404 slides outward toward the user and the shuttle 270 pivots so that it drops from a substantially horizontal position to a substantially vertical position, as shown in FIG. 11. In this way, any product that was resting on the shuttle when the shuttle door 404 was closed drops down to rest on the lip 272 of the shuttle 270. Because the front face 266 has moved toward the user, a user is able to access the vended product through the opening 405 in the shuttle door 404 (FIG. 11).

The shuttle 270 is positioned relative to the stop 254 so that, in certain embodiments, when the shuttle 270 is in the substantially horizontal position (shuttle door 404 is closed as shown in FIG. 12), stop 254 is engaged and the pusher 214 is free to move forward due to the action of the spring 250 and, in some embodiments, as slowed by the resistance mechanism, until a product reaches the forward-most position and abuts the front face 266 of shuttle door 404. Once the forward-most product abuts the front face 266 of shuttle door 404, additional product is restricted from advancing forward and the pusher 214 comes to a stop. When shuttle 270 drops to its substantially vertical position (shuttle door 404 is open as shown in FIG. 11), the product that was resting on the floor of shuttle 270 drops so that it is accessible to the user, while shuttle 270 also disengages stop 254, which prevents the pusher 214 from moving forward and advancing additional product for vending.

In this way, when the shuttle door 404 is closed, the shuttle 270 applies a generally horizontal force to stop 254 so that the stop 254 moves downward and forward along slots 232 into its engaged position (FIG. 21). Once in the engaged position, the engagement surfaces 256 of stop 254 no longer engage the protrusions 262 of brake 246 and pusher 214 is free to move forward due to the action of the spring 250, as described above, so long as there is room between the front face 266 of shuttle door 404 and the next product to be vended. When pusher 214 moves forward, shaft 201 rotates as described above so as to keep track of the number of product vended and/or remaining in the track 216.

When the shuttle door 404 (or other suitable door assembly) is open, the shuttle 270 (or other suitable structure) disengages stop 254 so that engagement surfaces 256 of stop 254 engage the protrusions of brake 246 and prevent pusher 214 from moving forward. In this way, the pushing assembly 200 is configured so that only one product may be removed at a time. The pushing assembly 200 is also configured so that product may only be removed when it is against the front face 266 of shuttle door 404 and received on the shuttle 270. This requires someone who wants to remove more than one product from the pushing system to wait for several seconds between removal of each product, which has been found to be a substantial deterrence to product theft. Moreover, door assembly 218 (such as shuttle door 404 or tip bin door 400) may include a spring or other mechanism (such as spring 264 in FIG. 9) that urges the door assembly 218 to its closed position.

In certain embodiments, a spacer 274 (shown in FIGS. 3 and 22-23) is used to accommodate products of different depths. Thus, use of a spacer 274 allows the door assembly 218 to accommodate a product that is greater in its depth dimension than the depth of the door assembly 218 without the spacer. Specifically, the depth of the spacer 274 corresponds to the depth of the product in relation to the depth of the door assembly 218. Similarly, the front to back ratio of the pushing assembly 200 also relates to the depth of the product. In this way, the pushing assembly 200 and door assembly 218 are customizable to accommodate products of varying dimensions and to meet the needs of a retail store. The tallest product that may be used with the door assembly 218 dictates the design of the door.

In an alternate embodiment, when stop 254 is in its engaged position, stop 254 prevents pusher 214 from advancing product forward. In such an alternate embodiment, stop 254 is positioned within resistance channel 234 so that the protrusions 260 of the stop 254 are received in sloped slots 232 on the side of the track 216. When the stop 254 is in a disengaged position, the protrusions 260 of the stop are located at one end of the slots 232. When sufficient force is applied to the front face 258 of the stop 254, the protrusions 260 on the side of the stop 254 move upward from one end of slots 232 to the other end of slots 232. Because slots 232 are sloped at an angle along track 216, movement of the protrusions 260 upward along the length of the slots 232 lifts the stop 254 vertically from the disengaged position to an engaged position. In this way, when horizontal force is applied to the front face 258 of stop 254, such as by opening door assembly 218, stop 254 moves both horizontally toward the rear of the track 216 and upward at the same time. When stop 254 is raised to the engaged position, the engagement surfaces 256 of the stop 254 raise to engage the projections 262 of the brake 246 that extend into resistance channel 234. When projections 262 of the brake 246 engage the engagement surfaces 256 of the stop 254, stop 254 prevents forward movement of the pusher 214. As described above, the back portion 261 of stop 254 includes a magnet 259 or other suitable mechanism. When door assembly 218 is open and stop 254 moves toward the rear of track 216 into its engaged position to prevent forward movement of the pusher 214, proximity sensor 300 senses such movement and can transmit this information in the manner described above.

As shown in FIGS. 1 and 19-21, in some embodiments, pushing assembly 200 is placed between two gondola-type retail shelves 202. In some embodiments, a plurality of pushing assemblies 200 are placed on the shelf 202 and separated by dividers 204. In some embodiments, the door assembly 218 is connected to the dividers 204. The dividers 204 and pushing assemblies 200 are then connected to a rail 268, shown in FIGS. 11-13 and 19-21, that is in turn attached to the shelf 202. The height of the pushing assemblies 200 and dividers 204 may be adjusted to accommodate the distance between the shelves 202. The dividers 204 and/or shuttle door 404 may optionally include a bar 276 (shown in FIGS. 11 and 21) that is either after-affixed or integrally molded as part of the dividers 204. The bar 276 may include rack gear teeth capable of engaging a damper associated with the door assembly 218 so that the door eases shut instead of slamming shut.

Figure 19:
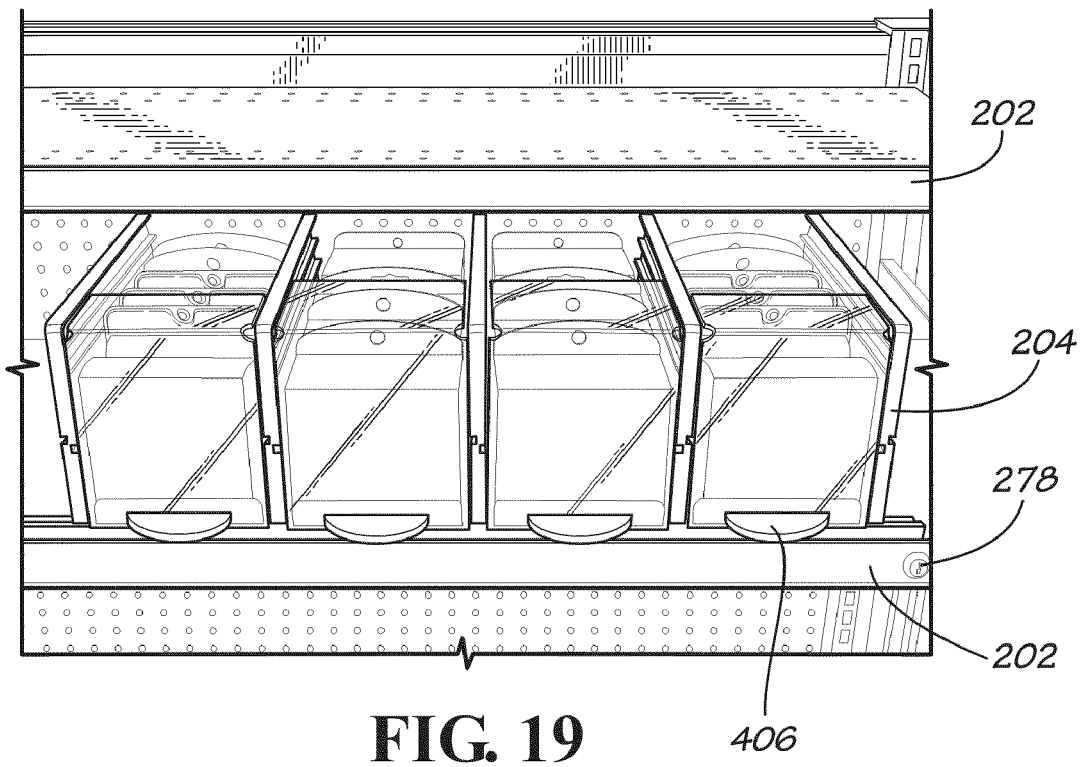
FIG. 19 is front view of a shelving unit that contains a plurality of assembled controlled access devices according to one embodiment of the present invention, with the shelving unit pulled out in drawer-like fashion.
Figure 20:
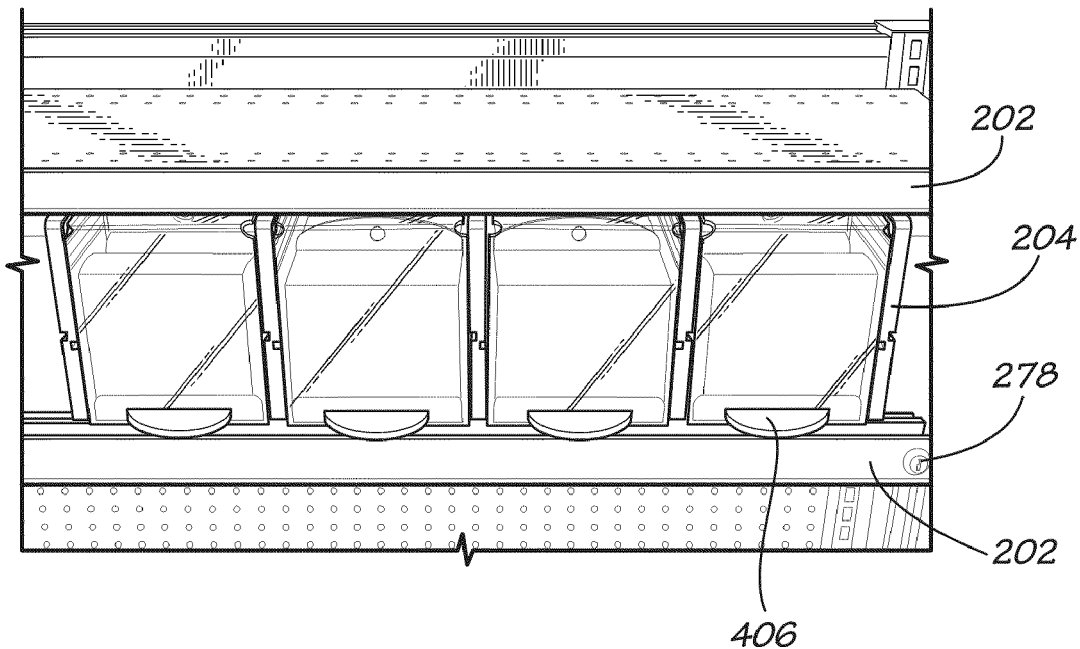
FIG. 20 is a perspective view of the shelving unit of FIG. 19, with the shelving unit in position for vending.

In some embodiments, shown in FIGS. 19-20, shelf 202 can be a sliding shelf. In these embodiments, shelf 202 may include a lock 278 that locks the shelf 202 in place. When unlocked, as shown in FIG. 19, the shelf 202 is capable of sliding forward in a drawer-like fashion so that product can be easily re-stocked from above.

While the invention has been described in detail with particular reference to the disclosed embodiments, it will be understood that variations and modifications can be affected within the spirit and scope of the invention as described herein.

What is claimed is:

1. A system for dispensing products comprising:
   (a) a device that controls access to products stored within the device comprising:
      (1) a door having an open position and a closed position, the door restricting access to the products stored within the device when the door is in the closed position;
      (2) a stop configured to be activated by the door; and
      (3) a movable pusher assembly that urges the products toward the door;
      (4) a rotatable shaft that rotates as the pusher assembly urges the products toward the door;
   (b) one or more sensors configured to sense the proximity of the stop to generate at least one signal relating to at least one of the following: whether the door is in the open or closed position; how long the door has been in the open position; when the pusher assembly moves to urge the products toward the front of the device; and the number of products stored within the device;
   wherein the one or more sensors are not accessible to a consumer attempting to access the products stored within the device;
   (c) a processor in electronic communication with the one or more sensors and configured to process data; and
   (d) a transmitter in electronic communication with the processor, the transmitter capable of transmitting at least some of the data processed in the processor to at least one device external to the system,
   wherein the rotatable shaft cooperates with a position sensor and wherein the processor is in electronic communication with the position sensor to process data received from the position sensor.

2. The system of claim 1, wherein the one or more sensors comprises one of the following: a Hall-Effect proximity sensor; a capacitive sensor, an inductive sensor, and a photoelectric sensor.

3. The system of claim 1, further comprising a resistance mechanism that slows the speed at which the movable pusher assembly urges the products toward the door.

4. The system of claim 1, wherein the stop is movable between a disengaged position and an engaged position, and wherein when the stop is in the engaged position, the stop prevents the pusher assembly from urging the products toward the door.

5. The system of claim 4, wherein moving the door to the open position moves the stop to the engaged position, preventing the pusher assembly from urging the products toward the door.

6. The system of claim 1, wherein the position sensor is a potentiometer that converts the rotation of the shaft into an electrical signal received by the processor relating to at least one of the following: (a) removal of a product from the device; (b) the number of products removed from the device; and (c) the number of products remaining in the device.

7. The system of claim 6, further comprising a receiver system that receives the processed data from the transmitter and generates an output signal based on the processed data.

8. The system of claim 7, wherein the output signal generated by the receiver system indicates at least one of the following: (a) removal of a product from the device; (b) the number of products removed from the device; and (c) the number of products remaining in the device.

9. The system of claim 8, wherein the output signal triggers an audible alert.

10. The system of claim 1, further comprising a receiver system that receives the processed data from the transmitter and generates an output signal based on the processed data.

11. The system of claim 10, wherein the output signal generated by the receiver system indicates at least one of the following: (a) that the door is in the open position (b) removal of a product from the device; and (c) the amount of time that the door has been in the open position.

12. The system of claim 11, wherein the output signal triggers an audible alert.

13. A system for dispensing products comprising:
   (a) a device comprising:
      (1) a track configured to receive a plurality of products;
      (2) a pusher in sliding engagement with the track, wherein the pusher urges the plurality of products toward a front of the track; and
      (3) a shaft that extends through an aperture in the pusher, wherein forward movement of the pusher rotates the shaft; and
   (b) one or more sensors configured to sense rotation of the shaft to generate at least one electrical signal relating to one or more of the following: (i) removal of a product from the device; (ii) the number of products remaining in the device; (iii) the number of products removed from the device,
   wherein the one or more sensors are not accessible to a consumer attempting to access the plurality of products stored within the device;
   (c) a processor in electronic communication with the one or more sensors and configured to process the at least one electrical signal received from the one or more sensors; and
   (d) a transmitter in electronic communication with the processor, the transmitter capable of transmitting at least some data processed in the processor to at least one device external to the system.

14. The system of claim 13, wherein the one or more sensors is a potentiometer.

15. The system of claim 14, further comprising a resistance mechanism that slows the speed at which the spring urges the pusher toward the front of the track.

16. The system of claim 13, further comprising a receiver system that receives the processed data from the transmitter and generates an output signal based on the processed data.

17. The system of claim 16, wherein the output signal generated by the receiver system indicates at least one of the following: (a) removal of a product from the device; (b) the number of products removed from the device; and (c) the number of products remaining in the device.

18. The system of claim 17, wherein the output signal triggers an audible alert.

19. The system of claim 13, wherein the shaft is substantially helix-shaped.

20. The system of claim 13, wherein the shaft is capable of rotating within the aperture in the pusher without obstruction.

21. The system of claim 13, wherein the shaft is configured so that when the pusher moves in a linear direction, the linear movement of the pusher is converted into a rotary motion of the shaft.

22. The system of claim 13, the device further comprising:
   (1) a door having (a) an open position and (b) a closed position for restricting access to the plurality of products stored within the device; and
   (2) a stop, wherein the stop is engaged and prevents the pusher from urging the plurality of products toward the front of the track when the door is in the open position and the stop is disengaged and allows the pusher to urge the plurality of products toward the front of the track when the door is in the closed position,
   wherein the system further comprising a proximity sensor configured to sense the proximity of the stop to generate at least one signal relating to at least one of the following: (a) whether the door is in the open or closed position; (b) how long the door has been in the open position; (c) when the pusher moves to urge product toward the front of the device; and (d) the number of products stored in the device, and
   wherein the processor is in electronic communication with the proximity sensor to process the at least one signal received from the proximity sensor.

23. The system of claim 21, further comprising a receiver system that receives the processed data from the transmitter and generates an output signal based on the processed data.

24. The system of claim 23, wherein the output signal generated by the receiver system indicates one or more of the following: (a) that the door is in the open position; (b) removal of a product from the device; and (c) that the door has been in the open position for more than a predetermined period of time.

25. The system of claim 24, wherein the output signal triggers an audible alert.

26. A system for dispensing products comprising:
   (a) a device comprising:
      (1) a track configured to receive a plurality of products;
      (2) a door having an open position and a closed position, the door restricting access to the plurality of products on the track when the door is in the closed position;
      (3) a stop configured to be activated by the door;
      (4) a pusher in sliding engagement with the track;
      (5) a spring that urges the pusher toward a front of the track; and
      (6) a shaft that extends through an aperture in the pusher, wherein forward movement of the pusher rotates the shaft;
   (b) one or more proximity sensors configured to sense the proximity of the stop to generate at least one signal relating to at least one of the following: (i) whether the door is in the open or closed position; (ii) how long the door has been in the open position; (iii) when the pusher assembly moves to urge product toward the front of the device; and (iv) the number of products stored within the device;
   wherein the one or more proximity sensors are not accessible to a consumer attempting to access product stored within the device;
   (c) one or more position sensors configured to sense rotation of the shaft to generate at least one electrical signal relating to one or more of the following: (i) removal of a product from the device; (ii) the number of products remaining in the device; (iii) the number of products removed from the device,
   wherein the one or more position sensors are not accessible to a consumer attempting to access product stored within the device;
   (d) a processor in electronic communication with the one or more proximity sensors and the one or more position sensors, the processor configured to process the at least one or more signals generated from the one or more proximity sensors and the one or more position sensors; and
   (d) a transmitter in electronic communication with the processor, the transmitter capable of transmitting at least some data processed in the processor to at least one device external to the system.

27. The system of claim 26, further comprising a receiver system that receives the processed data from the transmitter and generates an output signal based on the processed data.

28. The system of claim 27, wherein the output signal generated by the receiver system indicates one or more of the following: (a) the number of products removed from the device; (b) removal of a product from the device; (c) the number of products remaining in the device; (d) the door being in the open position (e) that the door has been in the open position for more than a predetermined period of time.

29. The system of claim 28, wherein the output signal triggers an audible alert.

30. The system of claim 26, wherein the stop prevents the pusher from moving toward the front of the track when the stop is in an engaged position, and wherein the pusher is permitted to move toward the front of the track when the stop is in the disengaged position.

31. The system of claim 30, wherein the stop is in the engaged position when the door is in the open position and the stop is in the disengaged position when the door is in the closed position.

32. The system of claim 26, wherein the one or more position sensors is a potentiometer that converts the rotation of the shaft into an electrical signal.

33. The system of claim 26, wherein the one or more proximity sensors is a Hall-Effect sensor.

* * * * *